US012535945B2

United States Patent
Winnemoeller et al.

(10) Patent No.: US 12,535,945 B2
(45) Date of Patent: *Jan. 27, 2026

(54) UTILIZING MODULARIZED ACTION BLOCKS IN A GRAPHICAL USER INTERFACE TO GENERATE DIGITAL IMAGES WITH CUSTOM MODIFICATIONS

(71) Applicant: Adobe Inc., San Jose, CA (US)

(72) Inventors: Holger Winnemoeller, Seattle, WA (US); Blake Williford, College Station, TX (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,749

(22) Filed: Mar. 18, 2024

(65) Prior Publication Data
US 2024/0231591 A1    Jul. 11, 2024

Related U.S. Application Data

(63) Continuation of application No. 16/842,346, filed on Apr. 7, 2020, now Pat. No. 11,934,647.

(51) Int. Cl.
*G06F 3/0482*    (2013.01)
*G06F 3/04845*   (2022.01)
*G06F 3/04847*   (2022.01)
*G06F 3/0486*    (2013.01)
*G06T 11/60*     (2006.01)

(52) U.S. Cl.
CPC .......... *G06F 3/04847* (2013.01); *G06T 11/60* (2013.01); *G06T 2200/24* (2013.01)

(58) Field of Classification Search
None
See application file for complete search history.

(56) References Cited

U.S. PATENT DOCUMENTS 6,130,676 A    10/2000  Wise et al.
6,546,188 B1   4/2003   Ishii et al.
(Continued)

OTHER PUBLICATIONS

GraphicRiver.net "Photoshop Actions"; Date downloaded Apr. 29, 2020; https://graphicriver.net/add-ons/photoshop/actions.
(Continued)

*Primary Examiner* — Irete F Ehichioya
*Assistant Examiner* — Samuel Shen
(74) *Attorney, Agent, or Firm* — Keller Preece PLLC

(57) ABSTRACT

The present disclosure relates to systems, methods, and non-transitory computer-readable media for using modularized digital editing action blocks in a graphical user interface to generate and apply a variety of advanced modifications to a digital image. The disclosed systems can categorize the digital editing action blocks into digital editing action categories from which a user can select a digital editing action block and insert into a field of a node compositor. Once the digital editing action block is arranged at a compatible field within the digital editing user interface, the snap effects system can execute the digital editing action block to create a particular graphical effect according to the positional configuration of the digital editing action block within the node compositor. In turn, the snap effects system can save the action-block configuration within the node compositor and facilitate additional use and/or sharing thereof.

20 Claims, 24 Drawing Sheets

(56) References Cited

U.S. PATENT DOCUMENTS

| | | |
|---|---|---|
| 8,380,005 B1 | 2/2013 | Jonsson |
| 2005/0068290 A1 | 3/2005 | Jaeger |
| 2008/0136820 A1* | 6/2008 | Yang .................. G06F 3/04845 |
| | | 345/173 |
| 2009/0300526 A1* | 12/2009 | Port ....................... G06Q 30/02 |
| | | 715/764 |
| 2011/0016419 A1 | 1/2011 | Grosz et al. |
| 2012/0002903 A1 | 1/2012 | Wilensky |
| 2013/0346898 A1* | 12/2013 | Kokemohr ............ G06F 3/0486 |
| | | 715/838 |
| 2014/0133782 A1* | 5/2014 | Asver ................ H04N 1/00159 |
| | | 382/309 |
| 2016/0139761 A1* | 5/2016 | Grosz ................ H04N 1/00145 |
| | | 715/769 |
| 2016/0196044 A1 | 7/2016 | McGill et al. |
| 2016/0284381 A1 | 9/2016 | Yang |
| 2017/0132694 A1* | 5/2017 | Damy .................. G06F 3/0488 |
| 2019/0104253 A1* | 4/2019 | Kawai .................. G06T 3/4038 |
| 2019/0236786 A1* | 8/2019 | McNerney ................ G06T 7/11 |
| 2020/0159871 A1* | 5/2020 | Bowen ..................... G06T 11/60 |
| 2021/0042110 A1 | 2/2021 | Basyrov |

OTHER PUBLICATIONS

"Try Blockly"; A JavaScript library for building visual programming editors; Date downloaded Apr. 29, 2020; https://developers.google.com/blockly.
U.S. Appl. No. 16/842,346, Aug. 4, 2021, Office Action.
U.S. Appl. No. 16/842,346, Feb. 11, 2022, Office Action.
U.S. Appl. No. 16/842,346, May 2, 2022, Office Action.
U.S. Appl. No. 16/842,346, Jan. 5, 2023, Office Action.
U.S. Appl. No. 16/842,346, May 25, 2023, Office Action.
U.S. Appl. No. 16/842,346, Nov. 11, 2023, Notice of Allowance.

* cited by examiner

UTILIZING MODULARIZED ACTION BLOCKS IN A GRAPHICAL USER INTERFACE TO GENERATE DIGITAL IMAGES WITH CUSTOM MODIFICATIONS

CROSS-REFERENCE TO RELATED APPLICATIONS

The present application is a continuation of U.S. application Ser. No. 16/842,346, filed on Apr. 7, 2020. The aforementioned application is hereby incorporated by reference in its entirety.

BACKGROUND

Recent years have seen significant improvements in computer systems for editing digital media, including digital images and digital video. For example, digital image editing systems can now modify parameters of digital images, crop digital objects illustrated in digital images, and/or fill empty or damaged regions of a digital image. Unfortunately, a number of problems still exist with conventional systems for editing digital content, including problems with regard to efficiency, accuracy, and adaptability of implementing computing systems.

For example, conventional systems attempt to enhance system utility by expanding available features and creating extensive options and interfaces for customizing digital content. This approach undermines efficiency because it multiplies the user interactions, user interfaces, and computing resources needed to generate enhanced digital media. For instance, conventional systems can require voluminous user interactions to identify interactive features within different user interfaces and iteratively modify individual features to generate a desired result. To create a desired digital image, conventional systems can require expert knowledge and thousands of different modifications through various user interfaces and corresponding user interactions.

In an attempt to address these inefficiencies, some conventional systems have opted for simplicity at the expense of utility or accuracy. For instance, some conventional systems offer generic, macro-like features incapable of achieving more advanced and/or customized graphical effects. Accordingly, this approach fails to generate digital media that accurately reflects desired effects. Moreover, to achieve more precise and advanced modifications, this approach still requires extensive post-editing processes, user interactions, and computer resources.

Further, conventional systems can present great difficulty in flexibly adapting features for personalized configuration and reuse. For example, large monolithic macros utilized in some conventional systems can be difficult to navigate in themselves, but are moreover difficult to parse and break up into features relevant to the user. In addition, adaptation efforts (whether user-driven or system-driven) often lead to increased breaking, throwing error, or system crashing. Furthermore, complex editing routines in conventional systems are often implemented rigidly and incrementally over hundreds or thousands of steps, making it difficult to flexibly manipulate, swap out, or repurpose complex editing effects. All of these problems make many conventional systems inaccessible to novice users.

BRIEF SUMMARY

Embodiments of the present disclosure provide benefits and/or solve one or more of the foregoing or other problems in the art with systems, non-transitory computer-readable media, and methods that utilize modularized digital editing action blocks in a graphical user interface to generate and apply a variety of advanced modifications to a digital image. For example, the disclosed systems can utilize digital editing action categories each comprising powerful, block-based actions (i.e., digital editing action blocks that correspond to executable instructions for complex image modifications) that enable intuitive image-editing in a digital editing user interface of a client device. The disclosed systems can identify digital editing action blocks generated by other system users (and stored on servers hosted all over the globe) and classify the digital editing action blocks for presentation within a dynamic digital editing user interface. Moreover, with minimal user interactions via a node compositor within the digital editing user interface, the disclosed systems can apply digital editing action blocks from one or more digital editing action categories to digital image content blocks for custom modification. Additionally or alternatively, users can add, delete, or swap out digital editing action blocks (or content blocks) to remix, build, and reuse one or more configurations of digital editing action blocks. In this manner, the disclosed systems can efficiently, flexibly, and accurately author high-quality graphical effects and perform advanced image-editing techniques.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
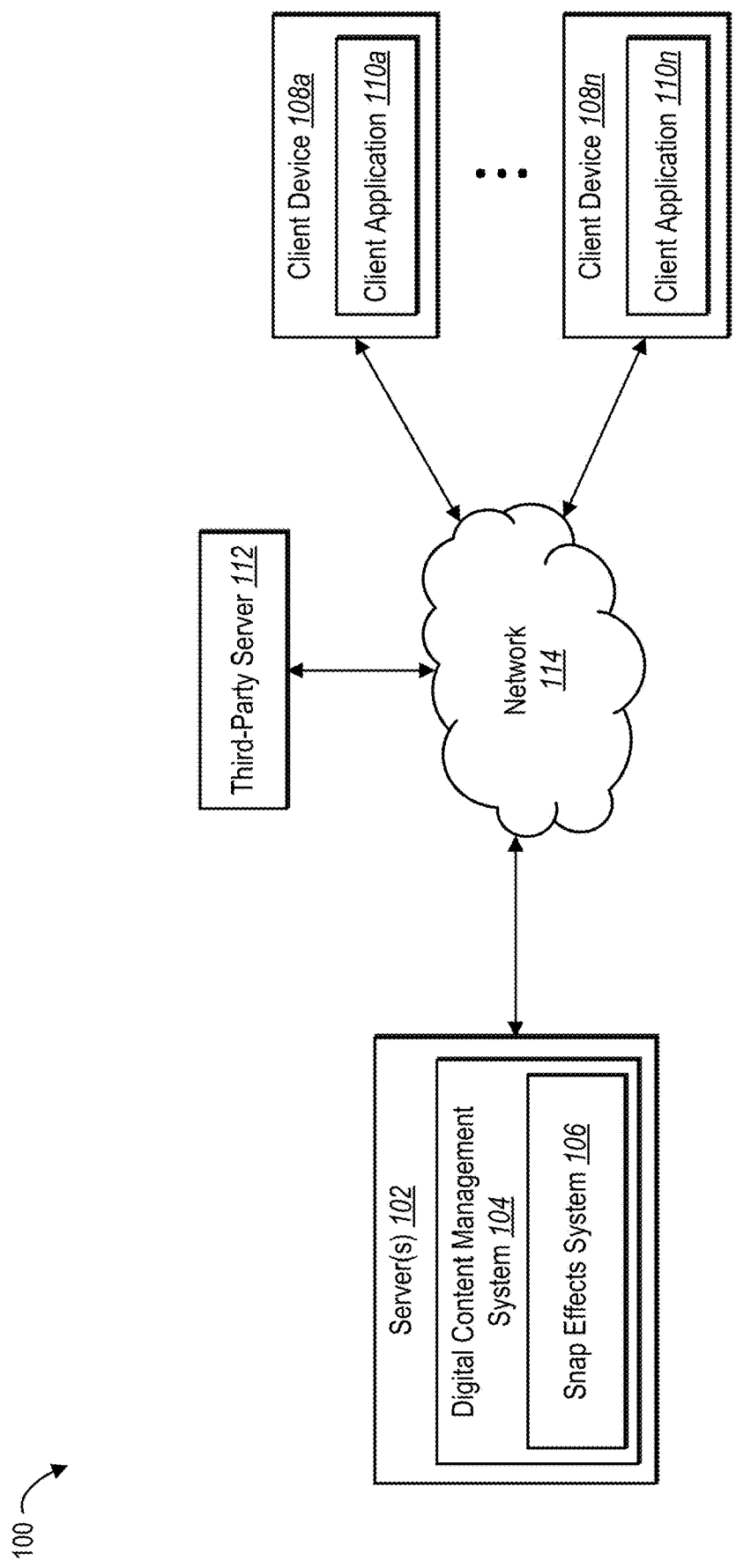
FIG. 1 illustrates a diagram of a system including a snap effects system in accordance with one or more embodiments.

This disclosure describes one or more embodiments of a snap effects system that utilizes modularized digital editing action blocks and content blocks in a graphical user interface to generate and apply a variety of advanced modifications to a digital image. In particular, the snap effects system modularizes complex graphical effects into functional sub-routines or digital editing action blocks, which can be intuitively manipulated for creating a personalized mash-up of digital editing action blocks (e.g., swap out a "sketch effect" for a "pen effect"). In more detail, the snap effects system can provide specific digital editing action categories such as textures, effects, cutouts, brushes, etc., which the snap effects system uses to provide corresponding system-defined and user-defined digital editing action blocks. Specifically, the snap effects system can source these system-defined and user-defined digital editing action blocks from a variety of users and/or servers across the world and, in turn, present them to the user in the graphical user interface for editing a digital image content block. In particular, when editing a digital image content block, the snap effects system can detect user interaction to move or insert a digital editing action block from a digital editing action category at an unpopulated field of a node compositor. Once the digital editing action block is arranged at an acceptable position relative to a content block within the node compositor of the graphical user interface, the snap effects system can apply a graphical effect according to the positional configuration of the digital editing action block. In addition, the snap effects system can facilitate convenient capturing and sharing of the action-block configuration and the corresponding graphical effect. Accordingly, the snap effects system can efficiently, accurately, and flexibly leverage user-generated and/or pre-defined digital editing action blocks to author and share enhanced digital media items.

To illustrate, in some embodiments, the snap effects system provides, for display within a digital editing user interface of a client device, a set of digital editing action blocks, one or more content blocks (e.g., a digital image content block), and a node compositor. The set of digital editing action blocks, as mentioned above, can include user-defined digital editing action blocks and system-defined digital editing action blocks. The content blocks can reflect different digital images that a user seeks to enhance or combine. Further, the node compositor can include a plurality of unpopulated fields that are configured to receive content blocks and digital editing action blocks for modifying the digital image. In particular, the snap effects system can receive a user input to movably arrange a digital editing action block of the set of digital editing action blocks to a position at an unpopulated field of the node compositor relative to a content block. In turn, the snap effects system can execute the digital editing action block, and based on the position of the digital editing action block within the node compositor at a given field relative to the content block, correspondingly modify the digital image.

As mentioned above, the snap effects system enables intuitive authoring and convenient sharing of graphical effects in the form of action-block configurations. In particular, the snap effects system can facilitate custom modifications to one or more digital images at a number of various client devices. Based on each respective set of custom modifications to corresponding digital images, each of the various client devices can contribute a unique user-defined digital editing action block to the snap effects system. In turn, the snap effects system facilitates, for a given user, advanced image-editing capabilities via one or more of the user-defined digital editing action blocks collectively contributed by third-party users. Further, the snap effects system provides system-defined digital editing action blocks, which the given user can use in addition to (or alternatively to) the user-defined digital editing action blocks to custom modify a digital image.

To help provide the user-defined digital editing action blocks and the system-defined digital editing action blocks in an efficient, intuitive fashion within a digital editing user interface of a client device, the snap effects system can intelligently map digital editing action blocks to certain digital editing action categories. In particular, the snap effects system can generate digital editing action categories and then map digital editing action blocks to digital editing action categories as the digital editing action blocks are generated. For example, the snap effects system can classify digital editing action blocks into a cutouts category, an effects category, a textures category, a backgrounds category, a brushes category, or a parameter tweaks category. Accordingly, the snap effects system can categorize and then provide, for display at the digital editing user interface of the client device, the digital editing action blocks according to the generated digital editing action categories.

From within the digital editing user interface at a client device, the snap effects system allows a user to select a digital editing action block from a digital editing action category, and move the digital editing action block to a position within a node compositor. In particular, the snap effects system can utilize a node compositor that includes a plurality of fields that dynamically guide a user to appropriate locations within the node compositor for each particular digital editing action block. For example, in response to a user selection of a digital editing action block, the snap effects system can identify a subset of fields that are compatible with the selected digital editing action block and can correspondingly disallow placement of the digital editing action block outside of the compatible fields. Further, the snap effects system can configure the node compositor such that positional placement of the digital editing action block within the node compositor (e.g., relative to a node tree) uniquely determines a graphical effect applied to the digital image. Accordingly, the user can choose where to place the selected digital editing action block (i.e., at which field) based on a desired graphical effect and the available subset of fields compatible with the digital editing action block.

Once the digital editing action block is positioned within a given field of the node compositor, the snap effects system can execute the digital editing action block and apply modifications to the digital image for the desired graphical effect. In particular, the snap effects system can determine portions of a digital image to modify using digital editing action blocks, based on the relative positions of the digital editing action blocks and content blocks within the node compositor. Additionally, the snap effects system can iteratively execute digital editing action blocks and apply corresponding modifications to the digital image in response to further user selection and placement of digital editing action blocks within the node compositor until achieving a finished graphical effect for the digital image. Upon execution of a digital editing action block within the node compositor, the snap effects system can save the action-block configuration for subsequent use and/or sharing, opening another action-block configuration (e.g., a third-party user-defined action-block configuration) for mixing or matching of action-block configurations, etc.

The snap effects system can implement a variety of different digital editing action blocks to flexibly and accurately modify digital images. For example, in some embodiments, the snap effects system utilizes a nested action block that includes a plurality of additional digital editing action blocks. For instance, the snap effects system can display a nested action block that includes sub-digital editing action blocks. The snap effects system can detect user interactions to revise, delete, or replace sub-digital editing action blocks to further customize the nested action block. In addition, the snap effects system can utilize workflow action blocks that operate in conjunction with additional user interaction and feedback to customize the results. For example, workflow action blocks can include a plurality of discrete operations that include different stages of user interaction to generate an enhanced digital image.

As suggested by the foregoing, the snap effects system can provide several technical advantages relative to conventional systems. For example, the snap effects system can improve efficiency relative to conventional systems. To illustrate, the snap effects system can decrease user interactions and computer processing requirements by utilizing a block-based approach to creatively author, reuse, and share high-quality graphical effects. Under the block-based approach, the snap effects system utilizes digital editing action categories comprising user-defined and system-defined digital editing action blocks that can generate complex digital modifications to digital images with few user interactions (e.g., a drag-and-drop user input). In particular, the snap effects system can embed underlying nuances, rules, and sub-routines for generating graphical effects into the digital editing action blocks and fields. In so doing, the snap effects system can avoid additional/unnecessary user inputs and alleviate lengthy navigation steps to locate and apply individual features. In the snap effects system, a user can select a digital editing action category and then position a digital editing action block from the digital editing action category (e.g., drag-and-drop) into an available field of the digital editing user interface, after which the snap effects system can automatically execute the digital editing action block to modify a digital image. Without digital editing action blocks, these effects can take hundreds or thousands of individual feature modifications with corresponding user interactions to execute.

Furthermore, unlike conventional systems, the snap effects system does not sacrifice utility or accuracy. As mentioned, the snap effects system embeds various subroutines for generating graphical effects into the digital editing action blocks and fields. In addition, the snap effects system can mix and match digital editing action blocks to create an action-block configuration that collectively provides customized, advanced graphical effects. Furthermore, the snap effects system can dynamically identify and classify new, user-generated digital editing action blocks, allowing users to accurately identify and apply digital image enhancements to achieve a desired result. The snap effects system can also automatically classify new digital editing action blocks into pertinent categories to allow for accurate, efficient identification and implementation of these digital editing action blocks. Accordingly, the snap effects system can perform complex modification to achieve an accurate graphical effect all by easily dragging-and-dropping digital editing action blocks into fields of the digital editing user interface.

In addition, the snap effects system can increase adaptability by facilitating personalized configurations, reuse, and sharing of digital editing action blocks or content blocks. With the modular digital editing action blocks and content blocks, users can incorporate specific graphical effects as desired while easily manipulating, swapping out or repurposing complex editing effects across digital images. Moreover, by utilizing dynamic fields in a node compositor integrated into the digital editing user interface, the snap effects system can identify and avoid potential conflicts in digital editing action blocks, thus, reduce breaking, throwing errors, or system crashing. In addition, the snap effects system directly integrates user-defined digital editing action blocks created by users of the snap effects system by facilitating the internal sharing of digital editing action blocks. Specifically, the snap effects system can generate and classify a database of digital editing action blocks including system-defined digital editing action blocks and user-defined digital editing action blocks from which a given user can select to modify a digital image. The snap effects system thus facilitates implementation of complex, enhanced digital image techniques to clients of all skill levels.

As illustrated by the foregoing discussion, the present disclosure utilizes a variety of terms to describe features and benefits of the snap effects system. Additional detail is now provided regarding the meaning of these terms. For example, as used herein, the term "digital editing action block" refers a user interface element for modifying a digital file (e.g., digital files such as JPG, TIF, PNG, GIF, RAW, HEIF, MOV, WAV, MP3, DOCX, PDF, XLSX, etc.). In particular, the digital editing action block can include a digital editing user interface element embedded with (or corresponding to) computer-executable instructions including functional routines and/or sub-routines that, when executed by a computing device, applies modifications to a digital image (e.g., modifications affecting one or more aspects or parameters of the digital image). For example, a digital editing action block can include a "sketch" effect, a "pen" effect, a "splash" cutout, a "red" color or texture, a "watercolor" brush, etc. In addition, a digital editing action block as displayed within a digital editing user interface is inclusive of other shapes beyond "block" shapes and can therefore include myriad shapes, sizes, and configurations (e.g., a triangular digital editing action block, a circular digital editing action block, a star-shaped digital editing action block, and so forth).

Further, a digital editing action block can be one of a variety of different types of digital editing action blocks. For example, a digital editing action block can be system-defined (e.g., generated or otherwise provided by the snap effects system). As another example, a digital editing action block can be user-defined (e.g., generated, modified, or otherwise shared by users of the snap effects system). In addition, a digital editing action block can be a nested action block comprising a subset of multiple digital editing action blocks grouped together to achieve a particular graphical effect. Similarly, a digital editing action block can be a workflow action block comprising one or more digital editing action blocks that are operable in conjunction with a user input (e.g., a crop workflow that requests a user, via a prompt, to identify certain individuals or objects within a digital image for the snap effects system to crop out). Relatedly, as referred to herein, the term "prompt" refers to a digital request for a user input within a digital editing user interface. Examples of a prompt may include a pop-up window, an error cue, a change in tool selection, etc. indicating the user is to provide a user input at the digital editing user interface. Such inputs at the digital editing user interface may include, for example, haptic inputs, verbal inputs (e.g., voice commands), or visual inputs (e.g., visual-based hand gestures, head/eye movement, facial expressions, etc.).

In addition, as used herein, the term "digital editing action category" refers to a classification of digital editing action blocks (e.g., a classification or grouping of digital editing action blocks within a digital editing user interface). In some embodiments, the snap effects system can illustrate digital editing action categories as digital editing user interface elements (e.g., a tabular feature). For example, the snap effects system can illustrate digital editing action categories as digital editing user interface elements that, in response to a user input, cause the display of two or more related digital editing action blocks depicted together in a grouping. For example, a digital editing action category can include a "cutouts" category, an "effects" category, a "textures" category, a "brushes" category, a "tweaks" category, a "background" category, etc. Accordingly, in response to a user input, for example, at the "effects" category, the snap effects system may cause the digital editing user interface to display a grouping of digital editing action blocks related to certain types of effects (e.g., a "sketch" action block, an "oil painting" action block, a "watercolor" action block, a "cartoon" action block, a "smoke" action block, a "glow" action block, etc.).

As further used herein, the term "node compositor" refers to an area of a user interface for managing digital editing action blocks and/or content blocks. In particular, the node compositor can include an area of a digital editing user interface designated to receive digital content (e.g., a digital image, a digital editing action block, etc.) in digital fields referred to herein as "fields." In more detail for example, when a user selects and places (i.e., populates) a given field of the node compositor with the selected digital editing action block, the snap effects system can execute the digital editing action block and correspondingly modify the digital image. In addition, the snap effects system can configure fields to identify one or more aspects of a selected digital editing action block and to correspondingly depict an indication of compatibility (e.g., an icon, symbol, visual cue, etc.) at one or more of the fields. Further, the snap effects system can position the fields relative to one or more nodes of a "node tree" in the node compositor (e.g., a node tree that indicates how to modify digital content based on the relative position of a digital editing action block within the node tree).

Additional detail will now be provided regarding the snap effects system in relation to illustrative figures portraying example embodiments and implementations of the snap effects system. For example, FIG. 1 illustrates a computing system environment (or "environment") 100 for implementing a snap effects system 106 in accordance with one or more embodiments. As shown in FIG. 1, the environment 100 includes server(s) 102, a client devices 108a-108n, a third-party server 112, and a network 114. Each of the components of the environment 100 can communicate via the network 114, and the network 114 may be any suitable network over which computing devices can communicate. Example networks are discussed in more detail below in relation to FIG. 11.

As shown in FIG. 1, the environment 100 includes the client devices 108a-108n (collectively, the client devices 108). The client devices 108 can each be one of a variety of computing devices, including a smartphone, tablet, smart television, desktop computer, laptop computer, virtual reality device, augmented reality device, or other computing device as described in relation to FIG. 12. Although FIG. 1 illustrates multiple client devices 108, in some embodiments the environment 100 can include a single client device 108. The client devices 108 can further communicate with the server(s) 102 via the network 114. For example, the client devices 108 can receive user inputs and provide information pertaining to the user inputs (e.g., that relate to a digital editing action block for modifying a digital image) to the server(s) 102.

As shown, each of the client devices 108 include a corresponding client application 110a-110n. In particular, the client applications 110a-110n (collectively, client applications 110) may be a web application, a native application installed on the client devices 108 (e.g., a mobile application, a desktop application, etc.), or a cloud-based application where part of the functionality is performed by the server(s) 102. The client applications 110 can present or display information to users respectively associated with the client devices 108, including information for generating, sharing, or utilizing digital editing action blocks to modify a digital image as described in more detail below.

As illustrated in FIG. 1, the environment 100 includes the server(s) 102. The server(s) 102 may execute, generate, store, receive, and transmit electronic data, such as executable instructions for generating system-defined digital editing action blocks, categorizing user-defined digital editing action blocks, and/or modifying a digital image based on action-block configurations arranged via the client applications 110. For example, the server(s) 102 may receive data from the client device 108a based on a user input to share a user-defined digital editing action block. In turn, the server(s) 102 can transmit data (e.g., based on the action-block configuration at the client application 110a) to one or more components in the environment 100. For example, the server(s) 102 can send the user-defined digital editing action block to the snap effects system 106 for categorizing into a digital editing action category comprising one or more other system-defined and/or user-defined digital editing action blocks. Additionally or alternatively, for example, the server(s) 102 may send data regarding the user-defined digital editing action block (now categorized into a particular digital editing action category) from the snap effects system 106 to the client device 108n in response to a user input to execute the user-defined digital editing action block and correspondingly modify a digital image at the client application 110n.

In some embodiments, the server(s) 102 and the third-party server 112 can exchange digital data, for example, to generate system-defined digital editing action blocks based on third-party data. In these or other embodiments, the server(s) 102 can communicate with the client devices 108 and the third-party server 112 to transmit and/or receive data via the network 116. In some embodiments, the server(s) 102 comprises a content server and/or a data collection server. The server(s) 102 can also comprise an application server, a communication server, a web-hosting server, a social networking server, or a digital content management server.

Although FIG. 1 depicts the snap effects system 106 located on the server(s) 102, in some embodiments, the snap effects system 106 may be implemented by on one or more other components of the environment 100 (e.g., by being located entirely or in part at one or more of the other components). For example, the snap effects system 106 may be implemented in whole, or in part, by the client devices 108 and/or the third-party server 112. In particular, in some implementations, the snap effects system 106 may provide various effects, such as brushes, for selection within the client applications 110 (e.g., a web browser version) at the client devices 108. Additionally or alternatively, in some implementations, the snap effects system 106 may cause the third-party server 112 and/or another cloud-based server of the digital content management system 104 to perform one or more aspects of image-processing (e.g., to modify a digital image based on a particular effect selection in the web browser). In this manner, the snap effects system 106 can distribute and alter various aspects of system functionality (e.g., via application programming interface calls) across one or more components of the environment 100.

As shown in FIG. 1, the snap effects system 106 is implemented as part of a digital content management system 104 located on the server(s) 102. The digital content management system 104 can organize, manage, and/or execute digital editing action categories and corresponding digital editing action blocks to modify digital images. For example, the digital content management system 104 can modify digital images as instructed by the snap effects system 106. As another example, the digital content management system 104 can also store action-block configurations specific to each of the client devices 108 (e.g., for reuse/application to other digital images, subsequent sharing, and/or mixing and matching with other digital editing action blocks).

In some embodiments, though not illustrated in FIG. 1, the environment 100 may have a different arrangement of components and/or may have a different number or set of components altogether. For example, the environment 100 may include an administrator device that may communicate directly with the snap effects system 106, bypassing the network 114.

Figure 2:
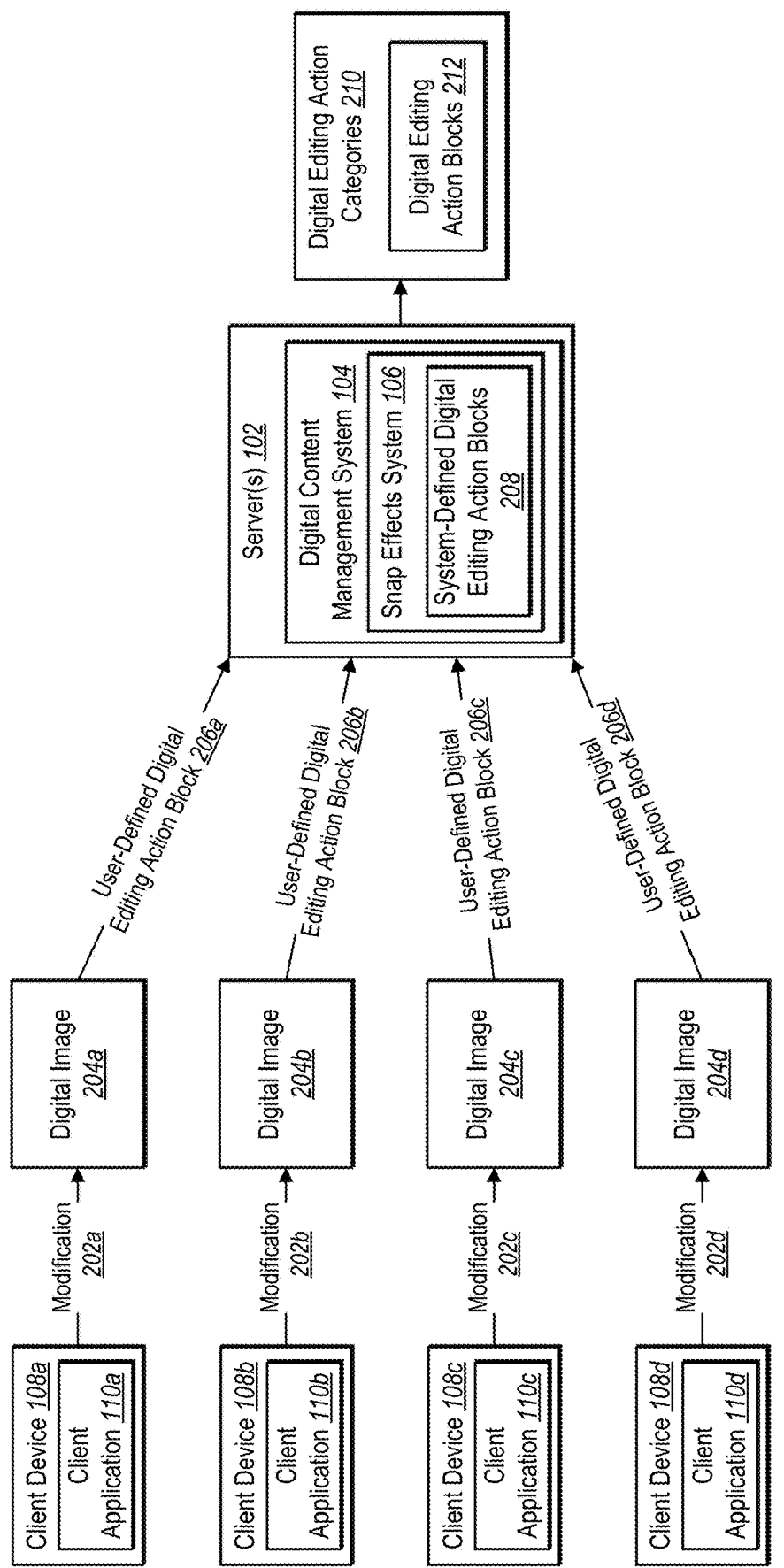
FIG. 2 illustrates a schematic diagram of a snap effects system generating digital editing action categories and digital editing action blocks in accordance with one or more embodiments.

As mentioned above, the snap effects system 106 can provide increased adaptability by facilitating multiple client devices (e.g., a network of system users) to modify respective digital images to create corresponding user-defined digital editing action blocks that are shareable with other users of the snap effects system 106. FIG. 2 illustrates a schematic diagram of the snap effects system 106 obtaining user-defined digital editing action blocks 206a-206d provided by system users to generate digital editing action categories 210 and digital editing action blocks 212 in accordance with one or more embodiments of the present disclosure. As shown, FIG. 2 illustrates the client devices 108a-108d and corresponding client applications 110a-110d described above in relation to FIG. 1. In particular, the snap effects system 106 facilitates the client devices 110a-110d providing respective modifications 202a-202d to corresponding digital images 204a-204d.

For example, via the client application 110a, a user associated with the client device 108a provides the modifications 202a to the digital image 204a. In these or other embodiments, providing the modifications 202a to the digital image 204a may include providing user inputs at a digital editing user interface of the client application 110a. The user inputs at the client device 108a can include user inputs (e.g., from a professional user) that include a series of complex modifications to a digital image. For example, consistent with user permissions (e.g., a user selecting to share or create a new modification or digital editing action block), the snap effects system 106 can monitor and record individual modifications to a digital image used to create a desired effect. Based on these user interactions, the snap effects system 106 can generate a new digital editing action block that reflects the modifications.

The user inputs at the client device 108 can also include user inputs arranging a configuration of one or more digital editing action blocks (e.g., within a node compositor). Once selectively arranged within the digital editing user interface of the client application 110a, the snap effects system 106 executes the one or more digital editing action blocks according to the first configuration. In so doing, the snap effects system 106 can generate or otherwise render the modifications 202a as applied to the digital image 204a.

The snap effects system 106 can share digital editing action blocks (e.g., newly created digital editing action blocks recorded based on user input or new configurations of digital editing action blocks) to other client devices. Indeed, as illustrated in FIG. 2, the snap effects system 106 shares the user-defined digital editing action block 206a. For instance, the client device 108a can provide a communication (e.g., a digital message or electronic request) to the snap effects system 106 to save and/or share the user-defined digital editing action block 206a. In like manner for the client devices 108b-108d, the snap effects system 106 can facilitate respective saving and/or sharing of a second, third, and fourth configuration of digital editing action blocks in the form of the user-defined digital editing action blocks 206b-206d.

Figure 4:
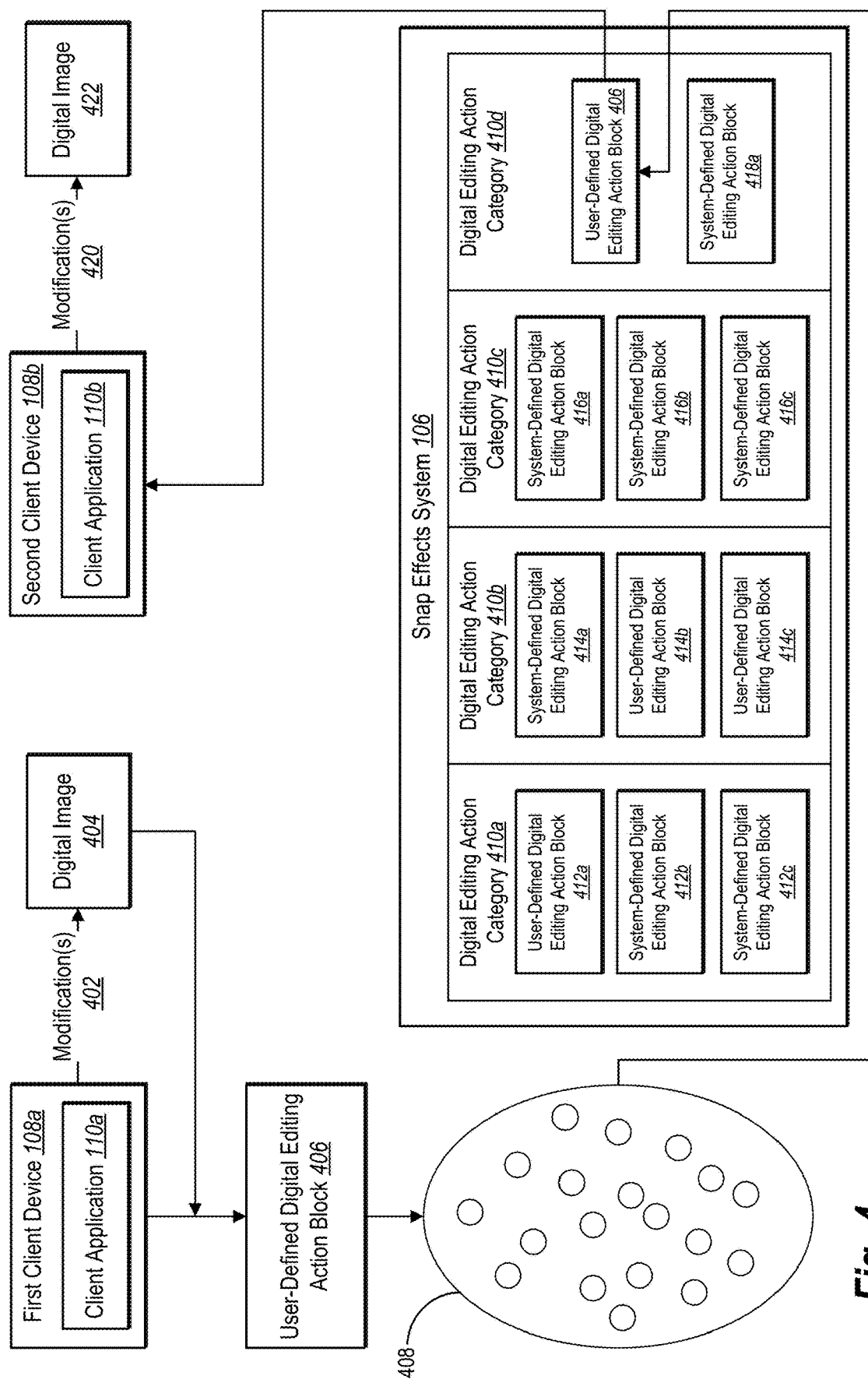
FIG. 4 illustrates a flow diagram of a snap effects system provisioning a user-defined digital editing action block from a first client device to a second client device in accordance with one or more embodiments.

As further illustrated in FIG. 2, the snap effects system 106 obtains the user-defined digital editing action blocks 206a-206d for analysis and categorization into the digital editing action categories 210 (described in more detail below in relation to FIG. 4). Upon such analysis and categorization, the snap effects system 106 can generate or otherwise populate the digital editing action categories 210 comprising the digital editing action blocks 212, which include both the system-defined digital editing action blocks 208 and the user-defined digital editing action blocks 206a-206d. In some embodiments, the snap effects system 106 analyzes and/or categorizes one or more of the system-defined digital editing action blocks 208 at the same time as one or more of the user-defined digital editing action blocks 206a-206d, while in other embodiments, at different times. For example, the snap effects system 106 may analyze and/or categorize the system-defined digital editing action blocks 208 into the digital editing action categories 210 during an initial time period, and at a later time (e.g., on a rolling basis as received or in batches) analyze and/or categorize the user-defined digital editing action blocks 206a-206d into the digital editing action categories 210.

Moreover, the snap effects system 106 can provide the digital editing action blocks 212 and the digital editing action categories 210 to another client device. For example, the snap effects system 106 can provide a digital editing user interface element that displays the digital editing action categories 210. A client device can select one or more digital editing action categories to select digital editing action blocks from the digital editing action blocks 212. Moreover, the client device can apply the digital editing action blocks to different content blocks (e.g., digital images, digital audio, digital video, and/or digital data representations).

Figure 3A:
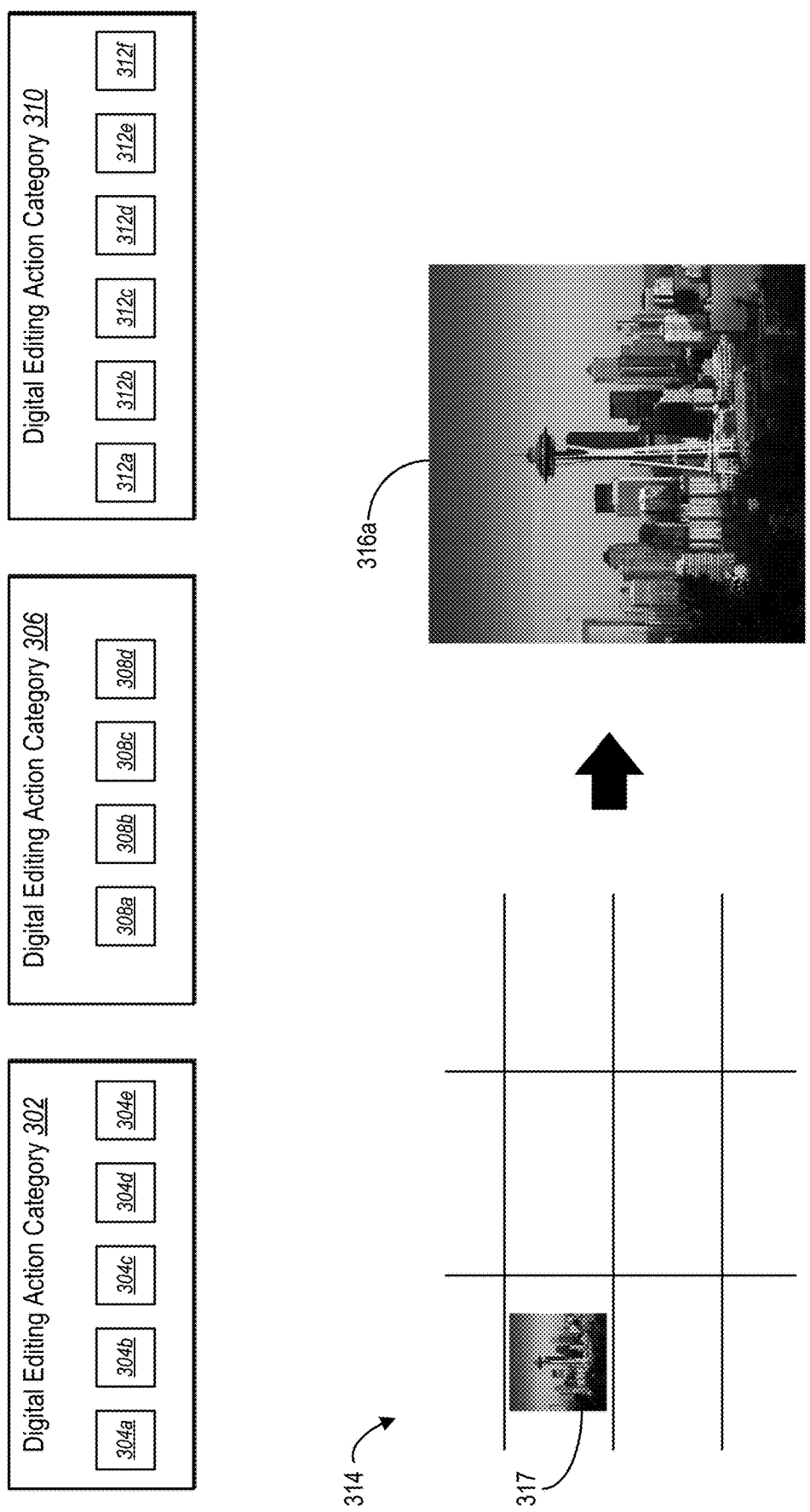
FIGS. 3A-3B illustrate schematic representations of a snap effects system generating digital editing action categories with corresponding digital editing action blocks for modifying a digital image.

As just mentioned, the snap effects system 106 can generate or otherwise populate digital editing action categories with digital editing action blocks comprising one or both of system-defined digital editing action blocks and user-defined digital editing action blocks. FIG. 3A illustrates a schematic representation of the snap effects system 106 generating digital editing action categories 302-310 with corresponding digital editing action blocks 304a-304e, 308a-308d, and 312a-312f (collectively, digital editing action blocks 304-312) for modifying a digital image 316a in accordance with one or more embodiments of the present disclosure. In these or other embodiments, the digital editing action blocks 304-312 may be the same as or similar to the digital editing action blocks 212 described above in relation to FIG. 2 and may therefore include one or both of system-defined digital editing action blocks and user-defined digital editing action blocks.

In more detail, FIG. 3A schematically illustrates the components that the snap effects system 106 provides to a digital editing user interface of a client device in accordance with one or more embodiments. In particular, the snap effects system 106 provides a node compositor 314 configured to receive one or more of the digital editing action blocks 304-312 for applying to a content block 317 representing the digital image 316a. The empty spaces or squares of the node compositor 314 represent fields where a user can selectively position (e.g., drag-and-drop) one or more of the digital editing action blocks 304-312 from a corresponding digital editing action category and/or upload the content block 317. In some embodiments, the snap effects system 106 loads the content block 317 into a particular field of the node compositor 314, for example, according to user inputs via a file upload feature of a digital editing user interface. The snap effects system 106 may further load the content block 317 into the node compositor 314 based on a user selection of the digital image 316a from a repository of digital images (e.g., via a drag-and-drop user input from the repository of digital images to the node compositor 314). Additionally or alternatively, in some embodiments, the snap effects system 106 can load the content block 317 into a default field and/or request the user, via a digital editing user interface prompt, to selectively position the content block 317 at an available field of choice in the node compositor 314. Once the content block 317 is positioned in the node compositor 314, the snap effects system 106 can selectively apply digital editing action blocks 304-312 to the content block 317 for modifying the digital image 316a.

When the node compositor receives one of the digital editing action blocks 304-312, the snap effects system 106 can execute the received digital editing action block to modify the digital image 316a (e.g., automatically execute on a rolling basis upon receipt of the digital editing action blocks 304-312 or in a batch manner upon user request or at various intervals). In addition, although the snap effects system 106 can initially provide fields of the node compositor 314 that are empty (as shown in FIG. 3A), in other embodiments, the snap effects system 106 loads preset or saved action-block configurations into the node compositor 314.

Figure 3B:
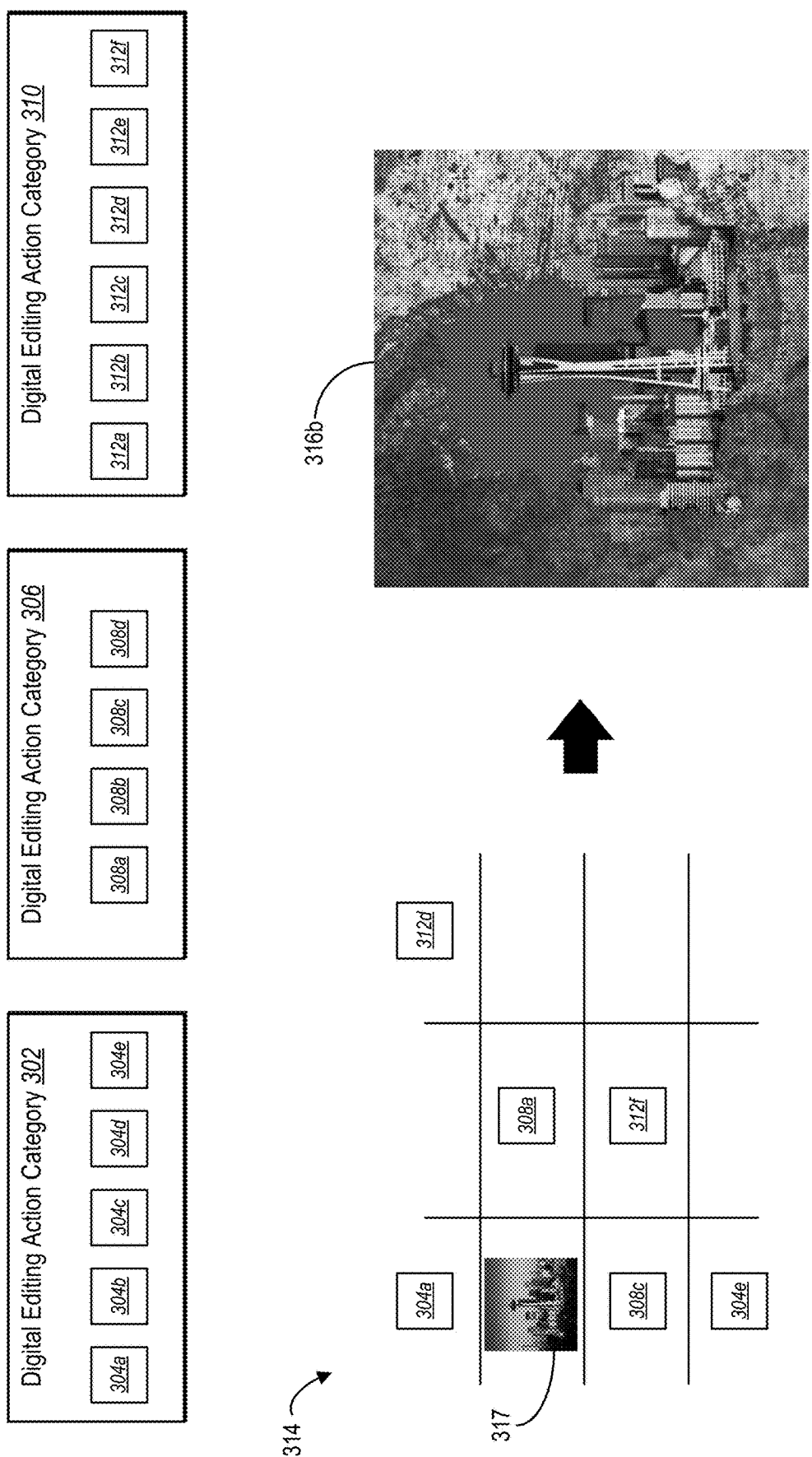

FIG. 3B illustrates a schematic representation of the snap effects system 106 generating a modified digital image 316b in accordance with one or more embodiments of the present disclosure. In particular, FIG. 3B shows the snap effects system 106 generating the modified digital image 316b in response to various digital editing action blocks 304-312 positioned at the node compositor 314 relative to the content block 317 (e.g., according to user inputs at a digital editing user interface of a client device). Specifically, in response to receiving the digital editing action blocks 304a, 312d, 308c, 308a, 312f and 304e at the node compositor 314, the snap effects system 106 can generate the modified digital image 316b with modifications made relative to the digital image 316a of FIG. 3A.

That is, the snap effects system 106 makes a specific set of modifications to the digital image 316a and generates the modified digital image 316b shown in FIG. 3B based on the particular digital editing action blocks 304a, 312d, 308c, 308a, 312f and 304e being placed in the node compositor 314 with the content block 317. In addition, the snap effects system 106 generates the specific set of modifications as rendered in the digital image 316b based on the unique positioning (e.g., row and column) of the content block 317 and each of the particular digital editing action blocks 304a, 312d, 308c, 308a, 312f and 304e in the fields of the node compositor 314. Thus, in some embodiments, the snap effects system 106 would generate a different version of the modified digital image 316b were different digital editing action blocks received at the node compositor 314 and/or a different positional configuration of these or other digital editing action blocks employed at the node compositor 314 relative to the content block 317. Such use and placement of digital editing action blocks in relation to a node compositor is described in more detail below in conjunction with at least FIGS. 5A-5G.

As mentioned above, the snap effects system 106 can categorize digital editing action blocks into particular digital editing action categories and then provide the categorized digital editing action blocks to users of the snap effects system 106. FIG. 4 illustrates a flow diagram of the snap effects system 106 provides a user-defined digital editing action block 406 received from a client device 108a to a second client device 108b in accordance with one or more embodiments of the present disclosure. As shown, a user at the client device 108 can provide a request to share the user-defined digital editing action block 406, and the snap effects system 106 can, in turn, provide the user-defined digital editing action block 406 to the second client device 108b (e.g., upon request for digital editing action blocks from the second client device 108b).

Utilizing the client application 110a of the client device 108a, the snap effects system 106 generates the user-defined digital editing action block 406 by applying modification(s) 402 to a digital image 404. The modification(s) 402 can include a modification corresponding to one or more digital editing action blocks from digital editing action categories 410a-410d (e.g., an available pool of system-defined and user-defined digital editing action blocks illustrated as digital editing action blocks 412a-412c, 414a-414c, 416a-416c, and 418a). Additionally or alternatively, the modification(s) 402 can include recorded alterations to a digital image made by the client device 108a via the client application 110a. In turn, the snap effects system 106 can generate the user-defined digital editing action block 406 based on the modification(s) 402 applied to the digital image 404. Thus, in some embodiments, the user-defined digital editing action block 406 can include a new action-block configuration comprising a completely new digital editing action block created by the user associated with the client device 108a and/or comprising a particular combination of one or more of the existing digital editing action blocks 412a-412c, 414a-414c, 416a-416c, or 418a.

After generating the user-defined digital editing action block 406, the snap effects system 106 implements a categorization analysis 408 to determine which digital editing action category 410a-410d corresponds to the user-defined digital editing action block 406. In the categorization analysis 408, the snap effects system 106 can analyze one or more characteristics associated with the user-defined digital editing action block 406. For example, in some embodiments, the snap effects system 106 implements the categorization analysis 408 by utilizing a heuristics approach. Under the heuristics approach, the snap effects system 106 can perform a rules-based analysis of the user-defined digital editing action block 406 to determine the steps, embedded rules, etc. that are associated with the user-defined digital editing action block 406 to determine the type of modification effectuated by the user-defined digital editing action block 406. For example, if the snap effects system 106 determines that the user-defined digital editing action block 406 comprises steps for removing content of a digital image, then the snap effects system 106 may categorize the user-defined digital editing action block 406 as corresponding to a cutout action category. Similarly, for instance, if the snap effects system 106 determines that the user-defined digital editing action block 406 comprises parameter changes to saturation or hue, then the snap effects system 106 may categorize the user-defined digital editing action block 406 as corresponding to a tweaks action category.

As an additional example of the categorization analysis 408, in some embodiments the snap effects system 106 applies the user-defined digital editing action block 406 to a test image. After application of the user-defined digital editing action block 406 to the test image, the snap effects system 106 can perform a before-and-after comparison of the test image as modified with an original version of the test image. Then, based on the before-and-after comparison, the snap effects system 106 can determine what modifications were applied as a result of executing the user-defined digital editing action block 406 and correspondingly categorize the user-defined digital editing action block 406. For example, if the snap effects system 106 detects a modification to the test image comprising smoke puffs or clouds of smoke applied to the test image as a result of executing the user-defined digital editing action block 406, the snap effects system 106 may categorize the user-defined digital editing action block 406 as corresponding to an effects action category. Likewise, if the snap effects system 106 detects a modification to the test image comprising watercolor paint strokes applied to the test image as a result of executing the user-defined digital editing action block 406, the snap effects system 106 may categorize the user-defined digital editing action block 406 as corresponding to a brushes action category.

In yet another example of the categorization analysis 408, in some embodiments, the snap effects system 106 applies the user-defined digital editing action block 406 to a machine-learning model to identify a proper digital editing action category. Examples of machine-learning models can include a neural network, linear regression model, logistic regression model, decision tree, support vector machine, naïve Bayes, k-nearest neighbor, k-means, random forest, dimensionality reduction algorithms, gradient boosting algorithms, etc. For instance, with respect to a neural network, the snap effects system 106 may train and apply any of a variety of neural networks to categorize the user-defined digital editing action block 406 (e.g., a convolutional neural network, a recurrent neural network, etc.).

To train a neural network to categorize the user-defined digital editing action block 406, the snap effects system 106 can compare predicted categorizations with ground truth data to determine a loss using a loss function. In particular, the snap effects system 106 can compare, utilizing a loss function, predicted digital editing action category probabilities for training-user-defined digital editing action blocks with ground truth data comprising actual category data for the training-user-defined digital editing action blocks. In these or other embodiments, the loss function can include, but is not limited to, a regression loss function (e.g., a mean square error function, a quadratic loss function, an L2 loss function, a mean absolute error/L1 loss function, mean bias error). Additionally, or alternatively, the loss function can include a classification loss function (e.g., a hinge loss/multi-class SVM loss function, cross entropy loss/negative log likelihood function).

Further, the loss function can return quantifiable data regarding the difference between the predicted digital editing action category probabilities with ground truth data. In particular, the loss function can return such loss data to the snap effects system 106 based upon which the snap effects system 106 can adjust various parameters/hyperparameters to improve the quality/accuracy of the predicted digital editing action category probabilities in subsequent training iterations—by narrowing the difference between predicted digital editing action category probabilities and ground truth digital editing action categories.

In some embodiments, the loss function can include an Adam optimizer for intelligently adjusting weights and various parameters/hyperparameters within the neural network. Moreover, the training of the neural network can be an iterative process such that the snap effects system 106 can continually adjust parameters/hyperparameters of the neural network over training iterations. Additionally or alternatively, in some embodiments, the snap effects system 106 can use machine-learning models for adjusting and/or categorizing parameters of corresponding user-defined digital editing action blocks. For example, in a similar manner as just described, the snap effects system 106 can train one or more machine-learning models to adjust and/or categorize parameters of corresponding user-defined digital editing action blocks (e.g., the user-defined digital editing action block 406) based on data associated with the parameters, image data that results from application of the parameters, etc.

Once the neural network is trained, the snap effects system 106 can then apply the user-defined digital editing action block 406 to the trained neural network. Specifically, at the trained neural network, the snap effects system 106 can, based on characteristics of the user-defined digital editing action block 406, return one of the digital editing action categories 410*a*-410*d* as the digital editing action category corresponding to the user-defined digital editing action block 406.

As a further example of the categorization analysis 408, the snap effects system 106 may compare one or more of the analyzed portions of the user-defined digital editing action block 406 with the characteristics of previously categorized digital editing action blocks 412*a*-412*c*, 414*a*-414*c*, 416*a*-416*c*, and 418*a*. Then, based on the comparisons, the snap effects system 106 can accordingly determine similarity scores with one or more digital editing action blocks and/or associated digital editing action categories. For example, the snap effects system 106 may determine a similarity score for each of the previously categorized digital editing action blocks 412*a*-412*c*, 414*a*-414*c*, 416*a*-416*c*, and 418*a*, and then generate an average similarity score for each corresponding digital editing action category 410*a*-410*d*. In addition, the snap effects system 106 can categorize the user-defined digital editing action block 406 into a digital editing action category with the highest similarity score. Thus, according to the foregoing example, the snap effects system 106 categorizes the user-defined digital editing action block 406 into the digital editing action category 410*d* in response to determining that the digital editing action category 410*d* is associated with a higher similarity score than the digital editing action categories 410*a*-410*c*.

Other embodiments herein contemplated for the categorization analysis 408 include a variety of other similarity scoring methods and comparison techniques for categorizing the user-defined digital editing action block 406 into one of the digital editing action categories 410a-410d. Additionally or alternatively to the categorization analysis 408, a user associated with the user-defined digital editing action block 406 can provide the snap effects system 106 with the appropriate digital editing action category for the user-defined digital editing action block 406. In other embodiments, a third-party moderator can provide the snap effects system 106 with the appropriate digital editing action category for the user-defined digital editing action block 406. Further, in some embodiments (e.g., for large batches of uncategorized user-defined digital editing action blocks), the snap effects system 106 can implement various entity-based (i.e., organizational-based) categorization, faceted searching/categorization techniques, and/or crowd-based suggestions for categorization.

In some embodiments, the digital editing action categories 410a-410d respectively correspond to one of a cutouts action category, an effects action category, a textures action category, a brushes action category, a tweaks action category, a background action category, among others. As used herein, the term "cutouts action category" refers to a classification of digital editing action blocks that, when executed, remove digital content within a digital image. For example, the cutouts action category can include a classification of digital editing action blocks that, when executed, select a portion of the digital image and remove content outside of the selected portion of the digital image. As further used herein, the term "effects action category" refers to a classification of digital editing action blocks that, when executed, cause a modification to the illustration style of the digital image. For example, the effects action category can include a classification of digital editing action blocks that, when executed, change the artistic medium used to depict the subject matter of the digital image.

Additionally, as used herein, the term "textures action category" refers to a classification of digital editing action blocks that, when executed, customize a look-and-feel of the digital medium upon which the subject matter of the digital image is depicted. For example, a textures action category can include a classification of digital editing action blocks that, when executed, change the physical appearance of a particular portion of the digital image by positioning an overlay onto the particular portion of the digital image. Further, as used herein, the term "brushes action category" refers to a classification of digital editing action blocks that, when executed, customize a manner in which an artistic medium is applied to the digital image. For example, the brushes category can include a classification of digital editing action blocks that, when executed, change parameters for the applied artistic medium (e.g., a paint stroke size, shape, thickness, darkness, transparency, etc.).

Still further, as used herein, the term "tweaks action category" refers to a classification of digital editing action blocks that, when executed, customize parameters associated with the digital image. For example, the tweaks action category can include a classification of digital editing action blocks that, when executed, change how the snap effects system 106 renders the digital image for display (e.g., hue, saturation, brightness, etc.). In addition, as used herein, the term "background action category" refers to a classification of digital editing action blocks that, when executed, modify the base portion of the digital image upon which the subject matter is depicted. For example, the background action category can include a classification of digital editing action blocks that, when executed, change a setting, environment, scheme, etc. for the digital image.

After categorizing the user-defined digital editing action block 406 into the digital editing action category 410d, the snap effects system 106 can provide the user-defined digital editing action block 406 to the second client device 108b via the client application 110b. For example, in response to a user input from the second client device 108b for selecting the digital editing action category 410d, the snap effects system 106 can provide the user-defined digital editing action block 406 to the second client device 108b via the client application 110b. For instance, the snap effects system 106 can provide the user-defined digital editing action block 406 for display within a digital editing user interface of the client application 110b and facilitate a user selection of the user-defined digital editing action block 406 (e.g., for positioning within a node compositor) to apply modification(s) 420 to a digital image 422. The modification(s) 420 correspond to one or more modifications effectuated in response to the snap effects system 106 executing the user-defined digital editing action block 406. In some embodiments (similar to the modification(s) 402), the modification(s) 420 may additionally include a modification corresponding to one or more digital editing action blocks from digital editing action categories 410a-410d (e.g., the available pool of digital editing action blocks 412a-412c, 414a-414c, 416a-416c, and 418a). In this manner, the snap effects system 106 can facilitate sharing and utilization of user-defined digital editing action blocks among system users.

Figure 5A:
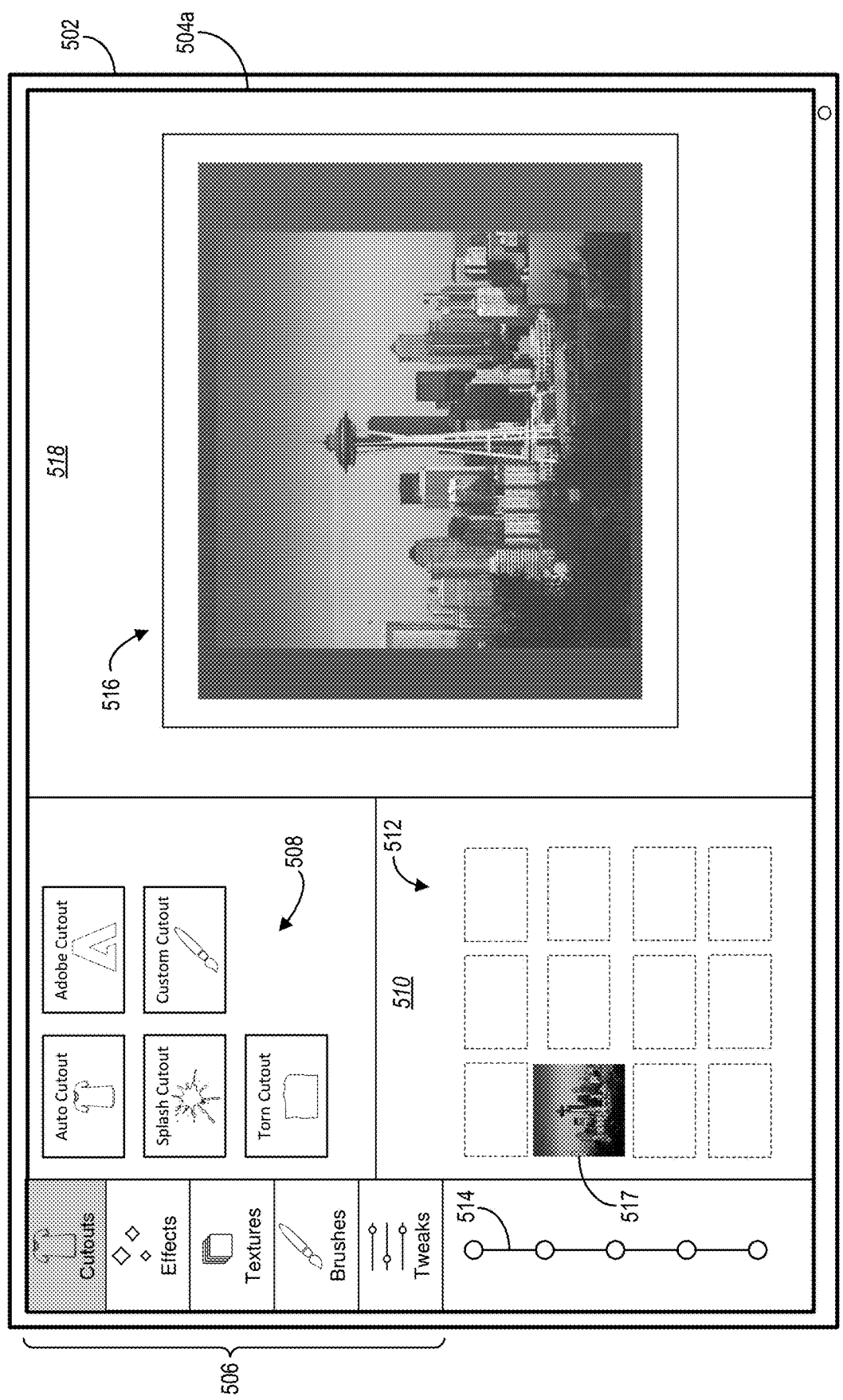
FIGS. 5A-5G illustrate digital editing user interfaces on a computing device for modifying a digital image in accordance with one or more embodiments.

As mentioned above, the snap effects system 106 can facilitate image modification within a digital editing user interface of a client device by providing selectable digital editing action blocks that can be movably positioned within a node compositor. FIGS. 5A-5G respectively illustrate digital editing user interfaces 504a-504g on a computing device 502 for modifying a digital image 516 in accordance with one or more embodiments of the present disclosure. As shown in FIG. 5A, the snap effects system 106 provides, for display within the digital editing user interface 504a, the digital image 516 to be modified in a rendering window 518 along with digital editing action categories 506 and a node compositor 510. Further, and as will be demonstrated in the following embodiments, the snap effects system 106 facilitates intuitive modification of digital images via a simplified, yet powerful digital editing user interface incorporating digital editing action blocks and digital editing action categories.

As illustrated in FIG. 5A, the snap effects system 106 loads, into the node compositor 510, a content block 517 representing the digital image 516 (e.g., according to user inputs via a file upload feature of the digital editing user interface 504a). Additionally shown, the snap effects system 106 can load the content block 517 into one of the fields 512 by default. Alternatively, the snap effects system 106 may request the user, via a prompt in the digital editing user interface 504a, to selectively position the digital content block 517 at one of the fields 512. Once positioned in one of the fields 512, the snap effects system 106 facilitates user selection of the digital editing action categories 506 and application of digital editing action blocks 508 to the content block 517 in the node compositor 510 as described in more detail below.

The digital editing action categories 506 in this example embodiment include a cutouts action category, an effects action category, a textures action category, a brushes action category, and a tweaks action category. In particular, the cutouts action category refers to a particular grouping of digital editing action blocks (illustrated as digital editing action blocks 508) relating to specific types of image cropping. As shown, the cutouts action category comprises the digital editing action blocks 508 that include, by way of example, an auto cutout, an Adobe® cutout, a splash cutout, a custom cutout, and a torn cutout. As shown in FIG. 5, in response to a user input selecting the cutouts action category of the digital editing action categories 506, the snap effects system 106 provides the digital editing action blocks 508 for display within the digital editing user interface 504a of the computing device 502. As mentioned above, the digital editing action blocks 508 are selectable elements that can be utilized to modify the digital image 516.

Moreover, in response to another user input selecting the effects action category of the digital editing action categories 506, the snap effects system 106 can provide, for display within the digital editing user interface 504a of the computing device 502, a different set of digital editing action blocks 508 relating to various types of effect modifications (e.g., a sketch effect, an oil painting effect, a watercolor effect, a cartoon effect, a smoke effect, a glow effect, etc.). Similarly, in response to another user input selecting the textures action category of the digital editing action categories 506, the snap effects system 106 can provide, for display within the digital editing user interface 504a of the computing device 502, a different set of digital editing action blocks 508 relating to various types of texture modifications (e.g., a colored texture, a paper texture, a wormhole texture, a space texture, a fog texture, a stone texture, a bubbles texture, a grunge texture, a wood texture, a vignette texture, a frame texture, etc.).

Further, in response to yet another user input selecting the brushes action category of the digital editing action categories 506, the snap effects system 106 can provide, for display within the digital editing user interface 504a of the computing device 502, a different set of digital editing action blocks 508 relating to various types of brush modifications (e.g., a smoke brush, a shimmer brush, a pencil brush, an energy brush, a fire brush, a watercolor brush, etc.). Additionally, in response to still another user input selecting the tweaks action category of the digital editing action categories 506, the snap effects system 106 can provide, for display within the digital editing user interface 504a of the computing device 502, a different set of digital editing action blocks 508 relating to various types of tweak modifications (e.g., changes to saturation, brightness, size, pixel ratio, edge/line width, fonts, renaming/mapping of parameters, language/spelling, etc.).

In these or other embodiments, alternative and/or more or fewer digital editing action categories 506 are herein contemplated. For example, the snap effects system 106 may utilize an additional digital editing action category for the digital editing action categories 506, such as a background action category comprising digital editing action blocks corresponding to background or environment modifications (e.g., backgrounds for a particular location, landscape, event, political figure, etc.).

Thus, as just described, after receiving a user input selecting one of the digital editing action categories 506 (in this case, the cutouts action category as indicated by being greyed out), the snap effects system 106 provides, for display within the digital editing user interface 504a of the computing device 502, the digital editing action blocks 508 for user selection. In particular, the snap effects system 106 configures the digital editing action blocks 508 as selectable such that, in response to another user input, a user can movably arrange one or more of the digital editing action blocks 508 into the node compositor 510 comprising a plurality of fields 512. For example, the snap effects system 106 facilitates a drag-and-drop user input in which a user can select one of the digital editing action blocks 508 and position the selected digital editing action block into one of the fields 512.

As illustrated in FIG. 5A, the snap effects system 106 configures the fields 512 in a grid-like pattern of rows and columns relative to a node tree 514. In some embodiments, the snap effects system 106 does not show the dotted lines illustrating the fields 512. Accordingly, the snap effects system 106 configures the fields 512 to align at or between nodes of the node tree 514, thereby mapping the fields 512 and helping to visually orient a user.

In a first column direction (i.e., a vertical direction parallel to the node tree 514), the snap effects system 106 arranges the fields 512 for receiving or identifying respective portions of digital content. Further, in a row direction (i.e., a horizontal direction perpendicular to the node tree 514), the snap effects system 106 arranges the fields 512 for receiving or identifying corresponding modifications to the respective portions of the digital content. Accordingly, positional placement of a digital editing action block within the node compositor 510 affects the manner in which modifications are applied to the digital image 516. FIGS. 5B-5G further illustrate this concept with application of digital editing action blocks to the fields 512 of the node compositor 510.

Additionally, in some embodiments, the snap effects system 106 facilitates interactions with or customization of the nodes of the node tree 514. For example, the snap effects system 106 can, in response to a user input, combine two or more nodes of the node tree 514 to create a merged node. With a merged node, the snap effects system 106 can, in effect, receive a digital editing action block at several of the fields 512 with a single digital editing action block. For example, the snap effects system 106 may apply a single "brightness" digital editing action block to digital content associated with multiple nodes of the node tree 514 (e.g., to brighten digital content in some of the fields 512 of both a first row and a second row tied to the merged node, but not a third row independent from the merged node).

Figure 5B:
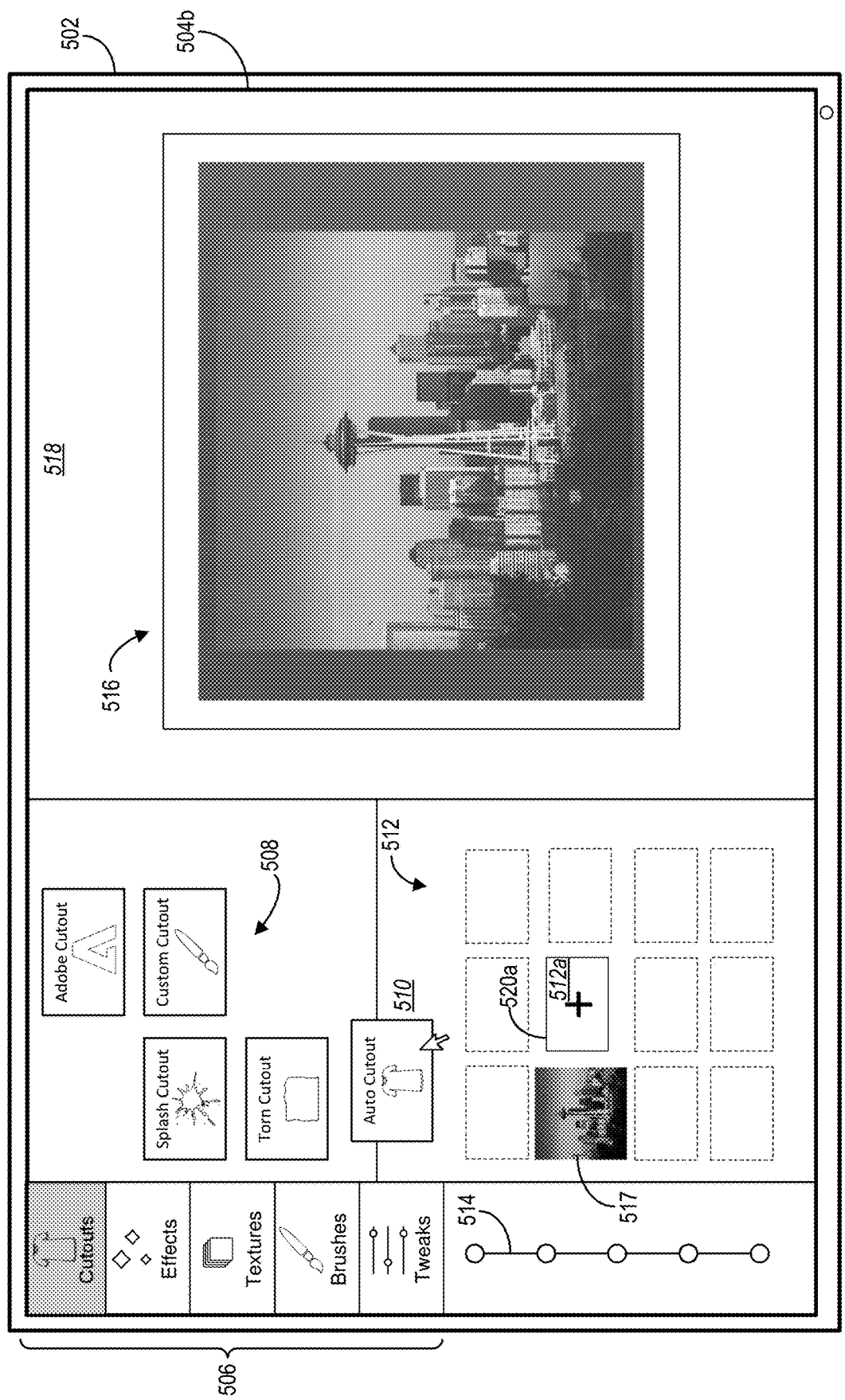

In FIG. 5B, the digital editing user interface 504b depicts a user selection of one of the digital editing action blocks 508 (i.e., the auto cutout). As shown, the user selection may include a drag-and-drop type of user input at the digital editing user interface 504b and may be initiated via a finger tap, cursor click, etc. at the given digital editing action block 508. Further, in response to the user input to movably arrange the selected digital editing action block 508, the snap effects system 106 makes a determination of whether one or more of the available (i.e., unpopulated) fields 512 is compatible with the selected digital editing action block 508.

To determine a compatibility for receiving the selected digital editing action block 508 at the fields 512, the snap effects system 106 can analyze one or more aspects of the selected digital editing action block 508. For example, the snap effects system 106 may analyze computer-executable instructions associated with the selected digital editing action block 508 to determine, for example, embedded program features or rules, types of digital image modifications to be effectuated, changes to system-defined parameters, metadata, etc. (or other suitable methods as described above in relation to the categorization analysis 408 of FIG. 4 for categorizing user-defined digital editing action blocks into digital editing action categories). In a similar manner, the snap effects system 106 can analyze one or more aspects of digital content (whether the content block 517 or a digital editing action block) populating one of the respective fields 512. Based on the foregoing analyses (e.g., as iteratively performed for the various fields 512), the snap effects system 106 can make a compatibility determination with respect to the selected digital editing action block 508 and provide, for display within the digital editing user interface 504b of the computing device 502, an indication of compatibility 520a at a corresponding field 512a. The indication of compatibility 520a may include a solid-lined perimeter of the field 512a, an icon (e.g., a "+" symbol), and/or other suitable visual cues representing suitability for adding the selected digital editing action block 508.

Accordingly, in these or other embodiments, the snap effects system 106 ensures, via the above-described compatibility determination, that syntactic requirements of the snap effects system 106 are upheld. For example, where the snap effects system 106 enforces a rule that a filter can only be applied to digital content comprising pixels, the snap effects system 106 may correspondingly forego presenting an indication of compatibility at one of the fields 512 where a selected filter-type digital editing action block is to modify a cutout (e.g., a cutout that lacks pixels). As an additional example, the snap effects system 106 may forego presenting an indication of compatibility at one of the fields 512 where a selected background digital editing action block would be positioned further along in the row direction so as to apply modifications to a foreground portion of the digital image.

In particular, and as shown in FIG. 5B, the snap effects system 106 generates the indication of compatibility 520a for the field 512a adjacent to, and in the same row as, the content block 517. Specifically, in this scenario, the snap effects system 106 generates the indication of compatibility 520a for the given field 512a based on determining that the selected digital editing action block 508 (i.e., the auto cutout action block) is compatible with the content block 517. In addition, where the snap effects system 106 configures the node compositor 510 to apply modifications to digital content in the row direction (i.e., the horizontal direction perpendicular to the node tree 514), the snap effects system 106 may accordingly determine suitability for particular placement of the selected digital editing action block 508. For example, the snap effects system 106 may determine that placement of the selected digital editing action block 508 elsewhere (e.g., not in the same row as the content block 517) in the node compositor 510 will lead to improper/non-applicable use of the selected digital editing action block 508. In this case, the snap effects system 106 prevents the user from being able to drag-and-drop the selected digital editing action block 508 into any of the fields 512 except for the field 512a.

In these or other embodiments, the snap effects system 106 provides the indication of compatibility 520a upon initially selecting one of the digital editing action blocks 508 from the digital editing action categories 506. In other embodiments, the snap effects system 106 provides the indication of compatibility 520a when proceeding to drag the selected digital editing action block 508 towards the node compositor 510. For example, when transitioning the selected digital editing action block 508 into the node compositor 510 (e.g., crossing a boundary of the node compositor 510), the snap effects system 106 may trigger the compatibility determination as described above and/or present the indication of compatibility 520a within the digital editing user interface 504b.

Figure 5C:
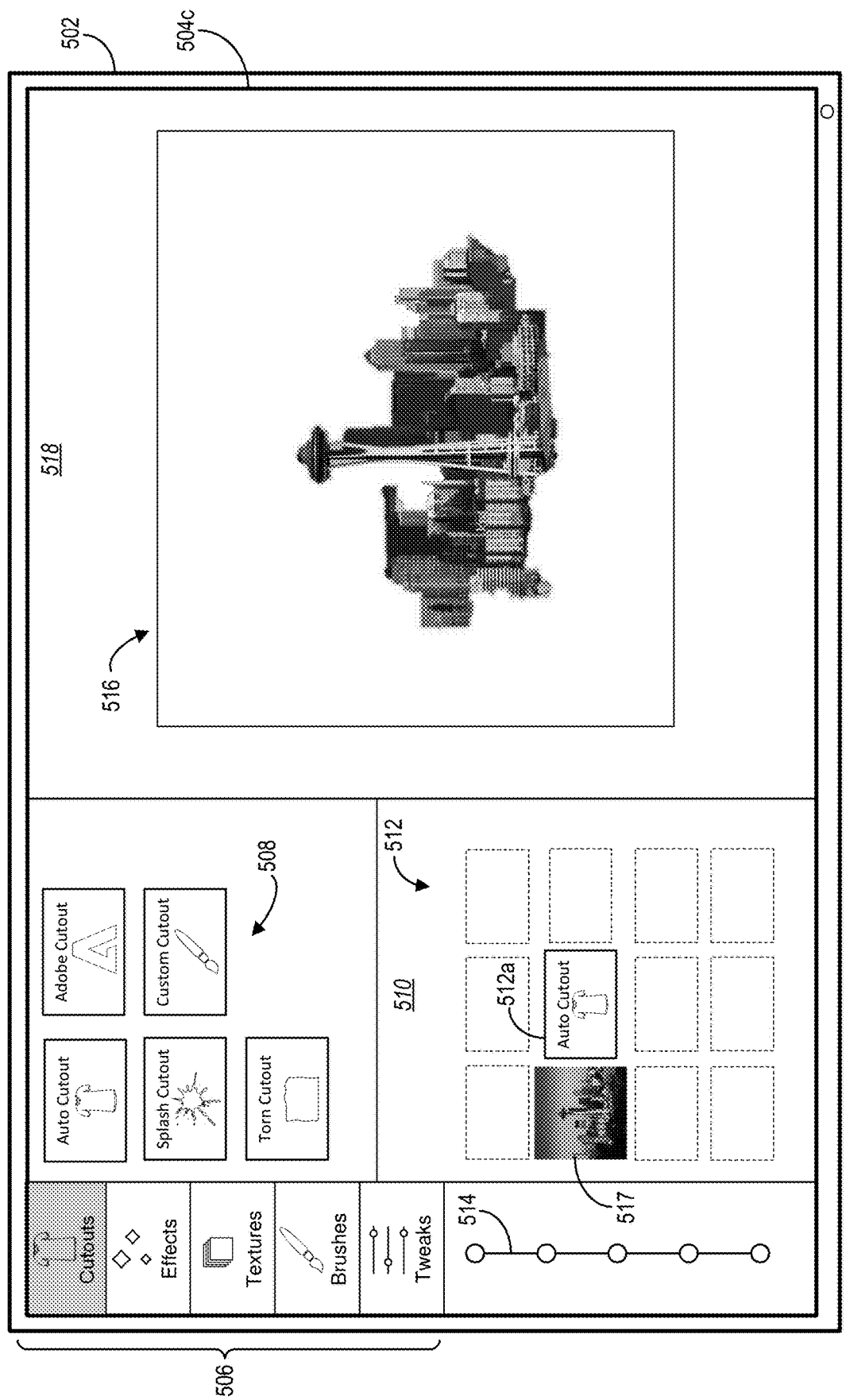

In FIG. 5C, the digital editing user interface 504c depicts the digital image 516 as modified according to the executed digital editing action block 508 (i.e., the auto cutout action block) positioned in the node compositor 510 at the field 512a in response to the user input illustrated in FIG. 5B. In some embodiments, after executing the auto cutout action block in the node compositor 510, the snap effects system 106 can provide, for display within the digital editing user interface 504c, an option to save and/or share the action-block configuration as instantiated in the node compositor 510. Additionally or alternatively, the snap effects system 106 can facilitate further action-block modifications of the digital image 516 as shown in FIG. 5D.

Figure 5D:
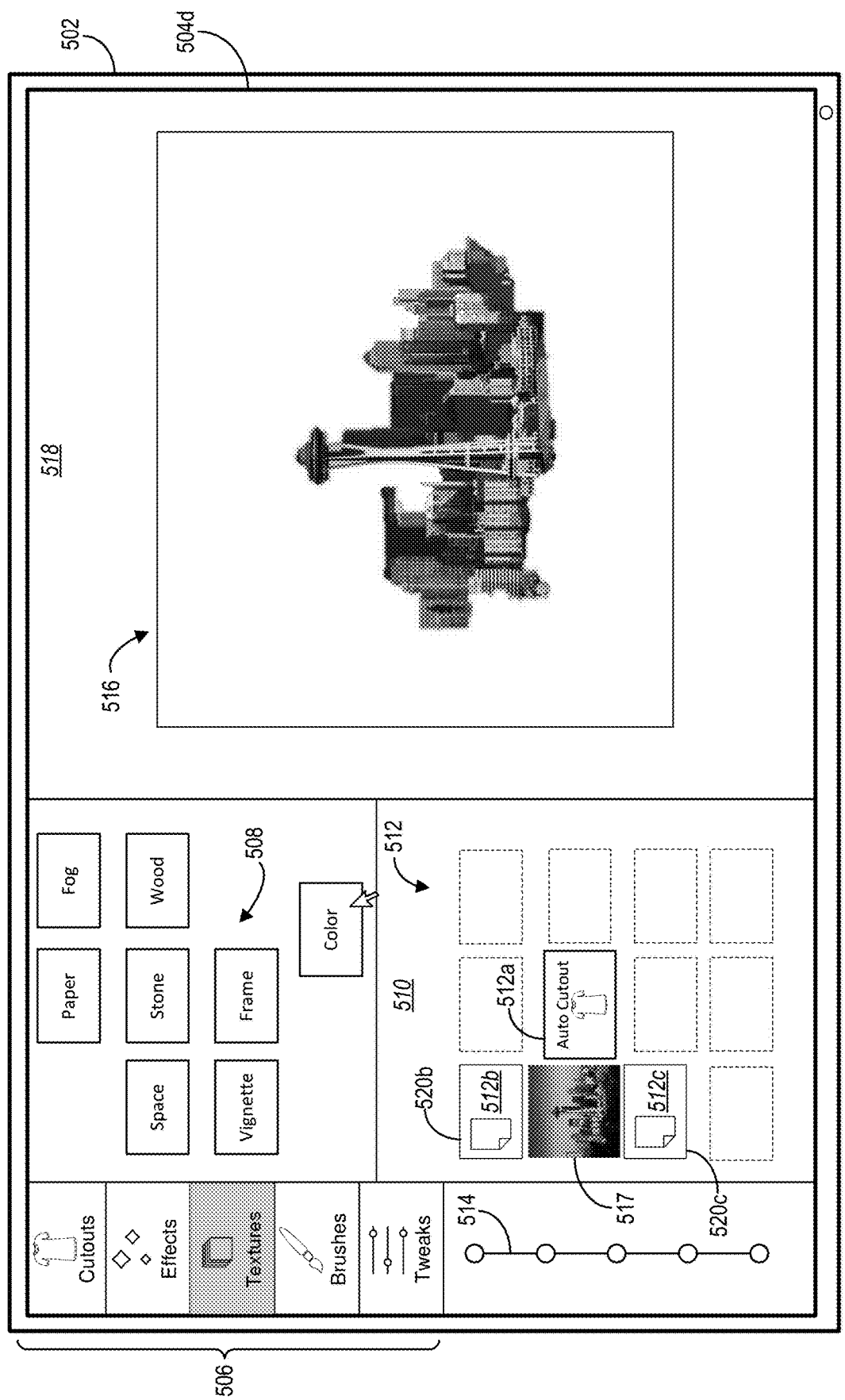

In FIG. 5D, the digital editing user interface 504d depicts a user selection of one of the digital editing action blocks 508 (i.e., the color action block) chosen from the textures action category of the digital editing action categories 506. The user selection may include a drag-and-drop type of user input at the digital editing user interface 504d and may be initiated via a finger tap, cursor click, etc. at the given digital editing action block 508. Further, in response to the user input to movably arrange the selected digital editing action block 508, the snap effects system 106 makes a compatibility determination as described above in relation to FIG. 5B regarding whether one or more of the available (i.e., unpopulated) fields 512 is compatible with the selected digital editing action block 508 (i.e., the color action block).

In particular, and as shown in FIG. 5D, the snap effects system 106 generates the indications of compatibility 520b-520c for respective fields 512b-512c adjacent to, and in the same column as the content block 517. In contrast to the indication of compatibility 520a of FIG. 5B comprising a plus-sign identifying a particular portion of the digital image 516 to modify, the indications of compatibility 520b-520c comprise a file/paper symbol identifying respective portions of digital content to modify. Specifically, in this scenario, the snap effects system 106 generates the indications of compatibility 520b-520c for the given fields 512b-512c based on determining that the selected digital editing action block 508 (i.e., the color action block) is compatible with the content block 517 as a modification to the background. Additionally or alternatively, the snap effects system 106 generates the indications of compatibility 520b-520c for the given fields 512b-512c based on determining that the selected digital editing action block 508 (i.e., the color action block) is compatible with the auto cutout as populated in the field 512a of the node compositor 510.

In addition, and as mentioned above, the snap effects system 106 configures the node compositor 510 to modify different portions of digital content in the column direction (i.e., the vertical direction parallel to the node tree 514). Accordingly, the snap effects system 106 may determine that placement of the selected digital editing action block 508 (i.e., the color action block) is suitable for the fields 512b-512c above or below the content block 517 in the column direction because the color action block provides an overlay of color onto the background (e.g., a portion different than the cutout portion). In this case, the snap effects system 106 prevents the user from being able to drag-and-drop the selected digital editing action block 508 into any of the fields 512 except for the fields 512b-512c associated with the indications of compatibility 520b-520c.

Figure 5E:
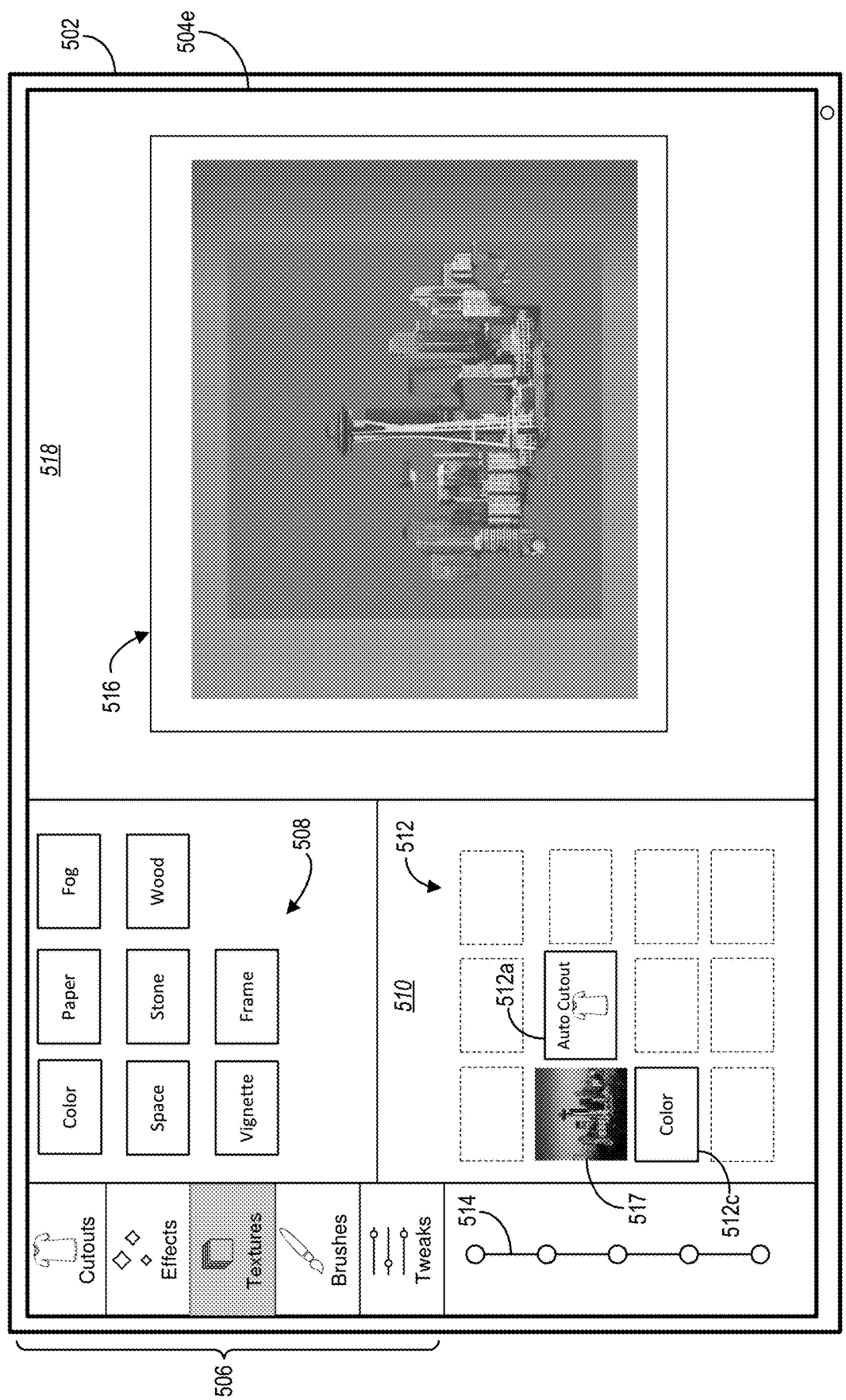

In FIG. 5E, the digital editing user interface 504e depicts the digital image 516 as modified according to the executed digital editing action blocks 508 (i.e., the auto cutout action block and the color action block) positioned in the fields 512a and 512c of the node compositor 510 in response to the user inputs illustrated in FIGS. 5B and 5D. Specifically, the snap effects system 106 applies the cutout action block to the digital image, leaving only a foreground portion. Because the color action block is positioned in a different row, the snap effects system 106 applies the color action block to a different portion of the digital image (e.g., the background remaining after the cutout). Specifically, the snap effects system 106 executes the color action block by identifying a sub-portion of the digital image 516 associated with the field 512*c* that is able to receive digital content (i.e., a background portion that can overlay a given color). After identifying the sub-portion of the digital image 516 configured to receive a color overlay, the snap effects system 106 completes execution of the color action block by applying the overlay at the identified sub-portion of the digital image 516. In some embodiments, after executing the color action block in the field 512*c* of the node compositor 510, the snap effects system 106 can provide, for display within the digital editing user interface 504*e*, an option to save and/or share the action-block configuration as instantiated in the node compositor 510. Additionally or alternatively, the snap effects system 106 can facilitate further action-block modifications of the digital image 516 as shown in FIG. 5F.

Figure 5F:
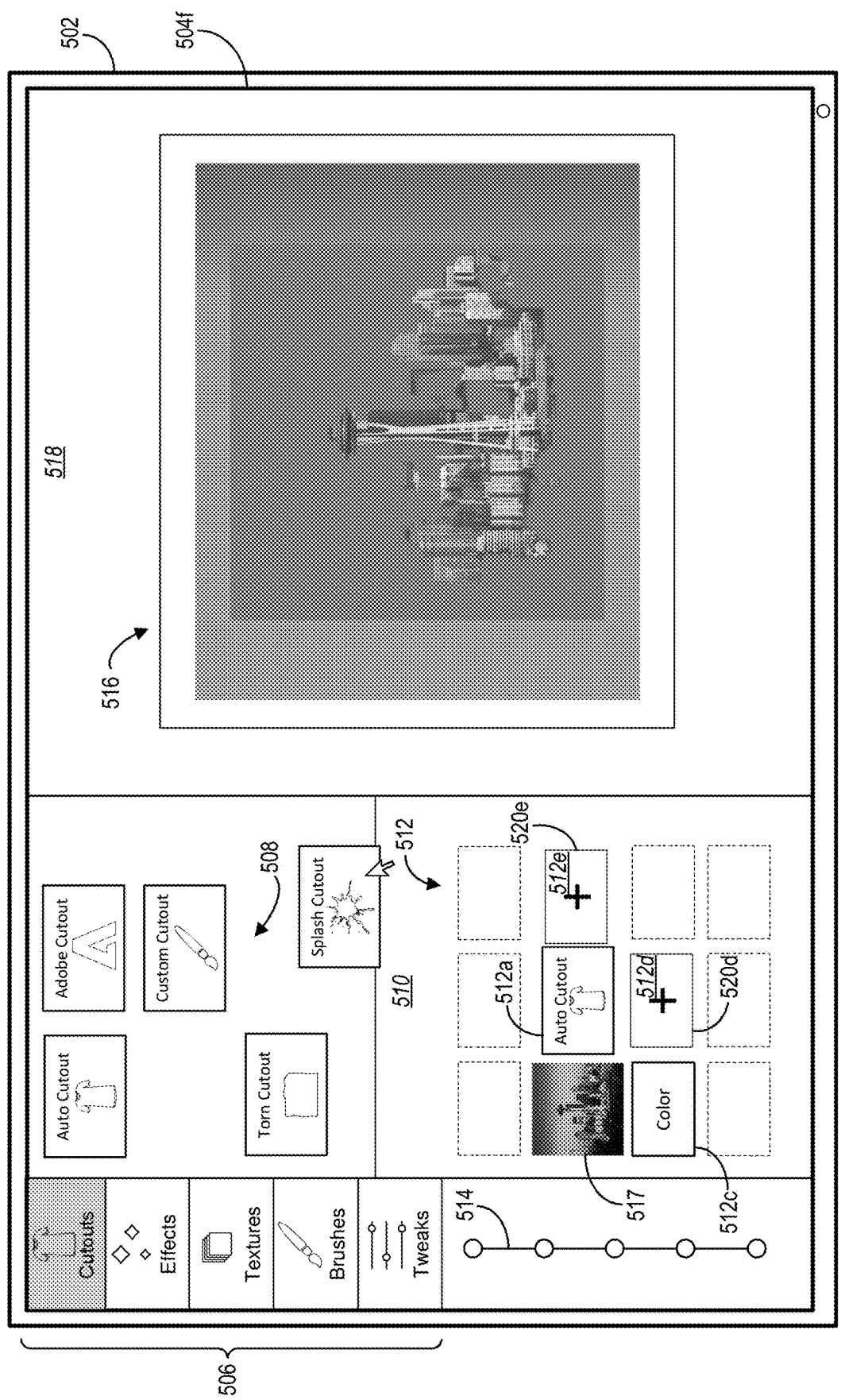

In FIG. 5F, the digital editing user interface 504*f* depicts a user selection of one of the digital editing action blocks 508 (i.e., the splash cutout action block) chosen from the cutouts action category of the digital editing action categories 506. The user selection may include a drag-and-drop type of user input at the digital editing user interface 504*f* and may be initiated via a finger tap, cursor click, etc. at the given digital editing action block 508. Further, in response to the user input to movably arrange the selected digital editing action block 508, the snap effects system 106 makes a compatibility determination as described above in relation to FIG. 5B regarding whether one or more of the available (i.e., unpopulated) fields 512 is compatible with the selected digital editing action block 508 (i.e., the splash cutout action block).

In particular, and as shown in FIG. 5F, the snap effects system 106 generates the indications of compatibility 520*d*-520*e* respectively for fields 512*d*-512*e* adjacent to, and in the same rows as, the fields 512*a* and 512*e* populated with the color action block and the auto cutout action block. Specifically, in this scenario, the snap effects system 106 generates the indications of compatibility 520*d*-520*e* for the given fields 512*d*-512*e* based on determining that the selected digital editing action block 508 (i.e., the splash cutout action block) is compatible with the color action block as populated in the field 512*c*. Additionally or alternatively, the snap effects system 106 generates the indication of compatibility 520*d*-520*e* for the given fields 512*d*-512*e* based on determining that the selected digital editing action block 508 (i.e., the splash cutout action block) is compatible with the auto cutout as populated in the field 512*a* and/or the content block 517.

As mentioned, the snap effects system 106 can make different modifications based on different locations of digital editing action blocks relative to a content block (digital image) within a node compositor. To illustrate, for placement of the splash cutout action block at the field 512*e*, the snap effects system 106 is configured to perform a splash cutout of the auto cutout such that portions of the cityscape of the digital image 516 (as previously rendered via the auto cutout) will be removed to leave a splash cutout of the cityscape. Similarly, for placement of the splash cutout action block at the field 512*d*, the snap effects system 106 is configured to perform a splash cutout of the color action block such that portions of the color overlay (as previously rendered via the color action block) will be removed to leave a splash cutout of the color overlay. In addition, the snap effects system 106 prevents positioning of the splash cutout action block at other of the fields 512 besides the fields 512*d*-512*e* to uphold syntactic rules of the snap effects system 106 Specifically, the snap effects system 106 prevents positioning of the splash cutout action block at other of the fields 512 because there is no other digital content in the fields 512 to cutout and because the splash cutout does not provide actual digital content for positioning along the column direction of the node compositor 510.

In addition, and as mentioned above, the snap effects system 106 configures the node compositor 510 to receive corresponding modifications to respective portions of digital content in the row direction (i.e., the horizontal direction perpendicular to the node tree 514). Accordingly, the snap effects system 106 may determine that placement of the selected digital editing action block 508 (i.e., the splash cutout action block) is suitable for either of the fields 512*d*-512*e* horizontally adjacent to the auto cutout action block and the color action block. In this case, the snap effects system 106 prevents the user from being able to drag-and-drop the selected digital editing action block 508 into any of the fields 512 except for the fields 512*d*-512*e* associated with the indications of compatibility 520*d*-520*e*.

Figure 5G:
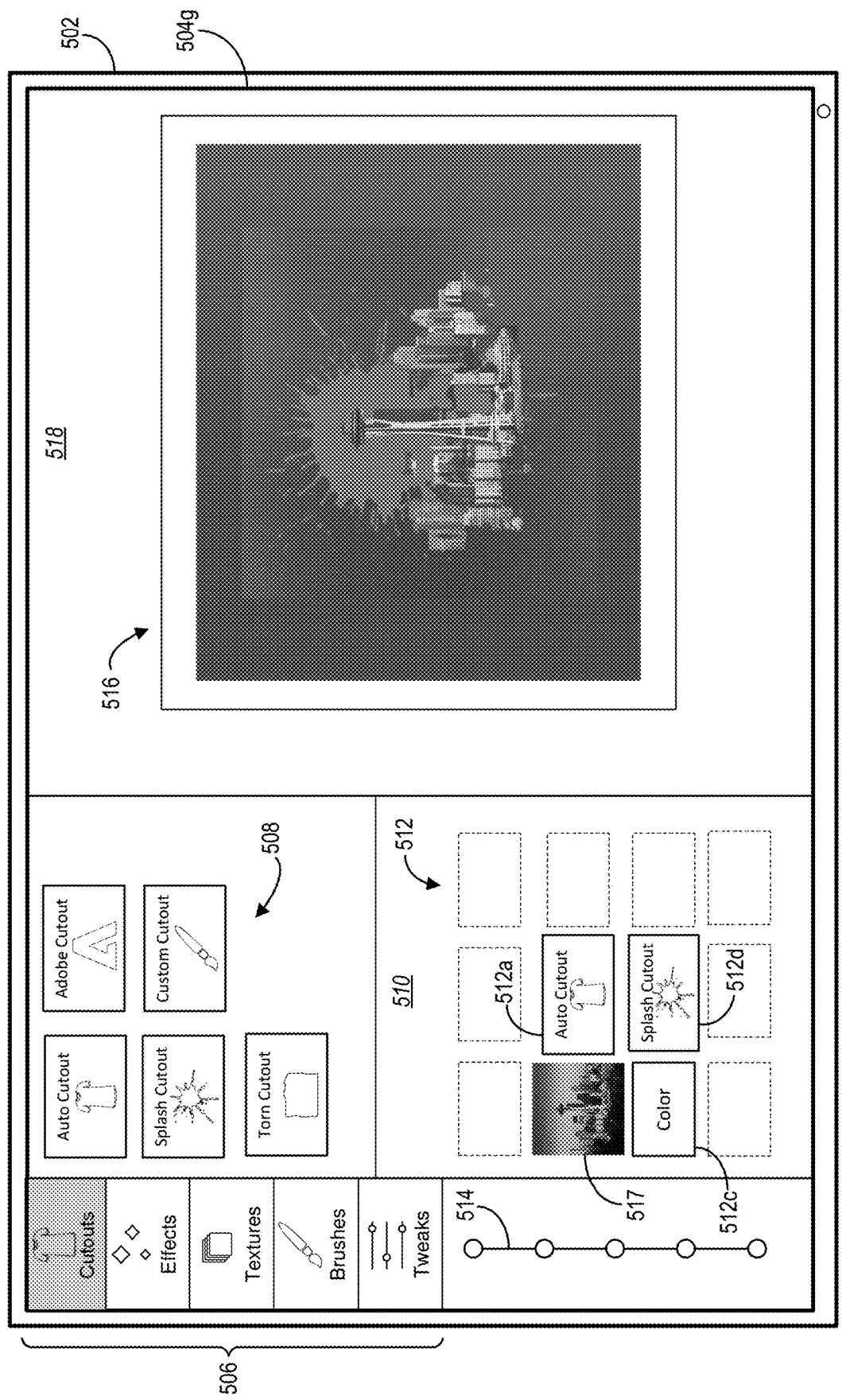

In FIG. 5G, the digital editing user interface 504*g* depicts the digital image 516 as modified according to the executed digital editing action blocks 508 (i.e., the auto cutout action block, the color action block, and the splash cutout action block) positioned in the fields 512*a*, 512*c*, and 512*d* of the node compositor 510 in response to the user inputs illustrated in FIGS. 5B, 5D, and 5F. Specifically, with respect to the splash cutout action block positioned at the field 512*d*, the snap effects system 106 executes the splash cutout action block by identifying the digital content to which the splash cutout action block modifies (i.e., the digital content in the row direction of the node compositor 510). Accordingly, the snap effects system 106 identifies a particular portion of the color overlay to modify in the digital image 516 (based on the previously executed color action block positioned in the row direction relative to the field 512*d* at the field 512*c*). After identifying the particular portion of the color overlay to apply the splash cutout, the snap effects system 106 completes execution of the splash cutout action block by applying the splash-like cropping at the identified portion of the color overlay. In some embodiments, after executing the splash cutout action block in the fields 512*d* of the node compositor 510, the snap effects system 106 can provide, for display within the digital editing user interface 504*f*, an option to save and/or share the action-block configuration as instantiated in the node compositor 510. Additionally or alternatively, the snap effects system 106 can facilitate further action-block modifications of the digital image 516 as described herein.

As just described in relation to the foregoing FIGS. 5A-5G, the snap effects system 106 executes various digital editing action blocks to modify the digital image 516. As also described and illustrated, using the snap effects system 106, a user can flexibly create complex enhancements to the digital image 516 through a few, simple user interactions for positioning digital editing action blocks within the node compositor 510 as opposed to the hundreds or thousands of user interactions needed in conventional systems to perform the same type of enhancements to a digital image.

Although FIGS. 5A-5G illustrate digital editing user interfaces 504*a*-504*g* for modifying digital images, in other embodiments, the snap effects system 106 can leverage the foregoing technical improvements by utilizing the above-described digital editing user interfaces for generating and/or modifying other digital media, such as digital audio or digital video. As an example, the snap effects system 106 may, via the node compositor 510 and digital editing action blocks 508, facilitate foley by sound artists to mimic, in auditory layers, a particular sound creation. In particular, each layer in the sound creation may need a particular sound effect applied thereto (e.g., reverberation, noise removal, pitch adjustment, etc.), which a user can apply utilizing corresponding digital editing action blocks placed in certain positions of the node compositor 510.

In another embodiment, the snap effects system 106 can utilize the foregoing digital editing user interfaces for a data collection implementation. For example, the snap effects system 106 may, via the node compositor 510 and digital editing action blocks 508, facilitate a wide variety of filters, pre-processing steps, etc. applied at one or more layers within an analytics data compilation. The snap effects system 106 can then generate a more refined, relevant analytics report based on corresponding digital editing action blocks placed in certain positions of the node compositor 510.

Additionally, in some embodiments, the digital editing user interfaces 504a-504g can include one or more options for configuring a predetermined selection of parameters of the snap effects system 106, for example, renaming or mapping of various parameters when generating user-defined digital editing action blocks. As an example, the parameter name of "radius" may be non-intuitive to users and indefinite as to its application of various radii. Accordingly, the snap effects system 106 can facilitate manual and/or automatic renaming of the parameter and/or a corresponding digital editing action block name to a name that is more functionally descriptive and meaningful to a user (e.g., "edge width" or "outline thickness"). In another example, the snap effects system 106 may, according to a user input, change the parameter name of "hue" to "color of clouds" to help better orient the user and/or other users as to what modification the parameter visually affects. For instance, the snap effects system 106 may provide one or more digital editing user interface elements within the digital editing user interfaces 504a-504g that, when selected via a user input, creates a new parameter label and/or edits an existing parameter label. In more detail, the snap effects system 106 can provide a particular selection of parameters, accessible from the digital editing user interfaces 504a-504g, that are customizable name-wise via a settings tab, direct editing at the parameter name via a right-click, etc.

Figure 6A:
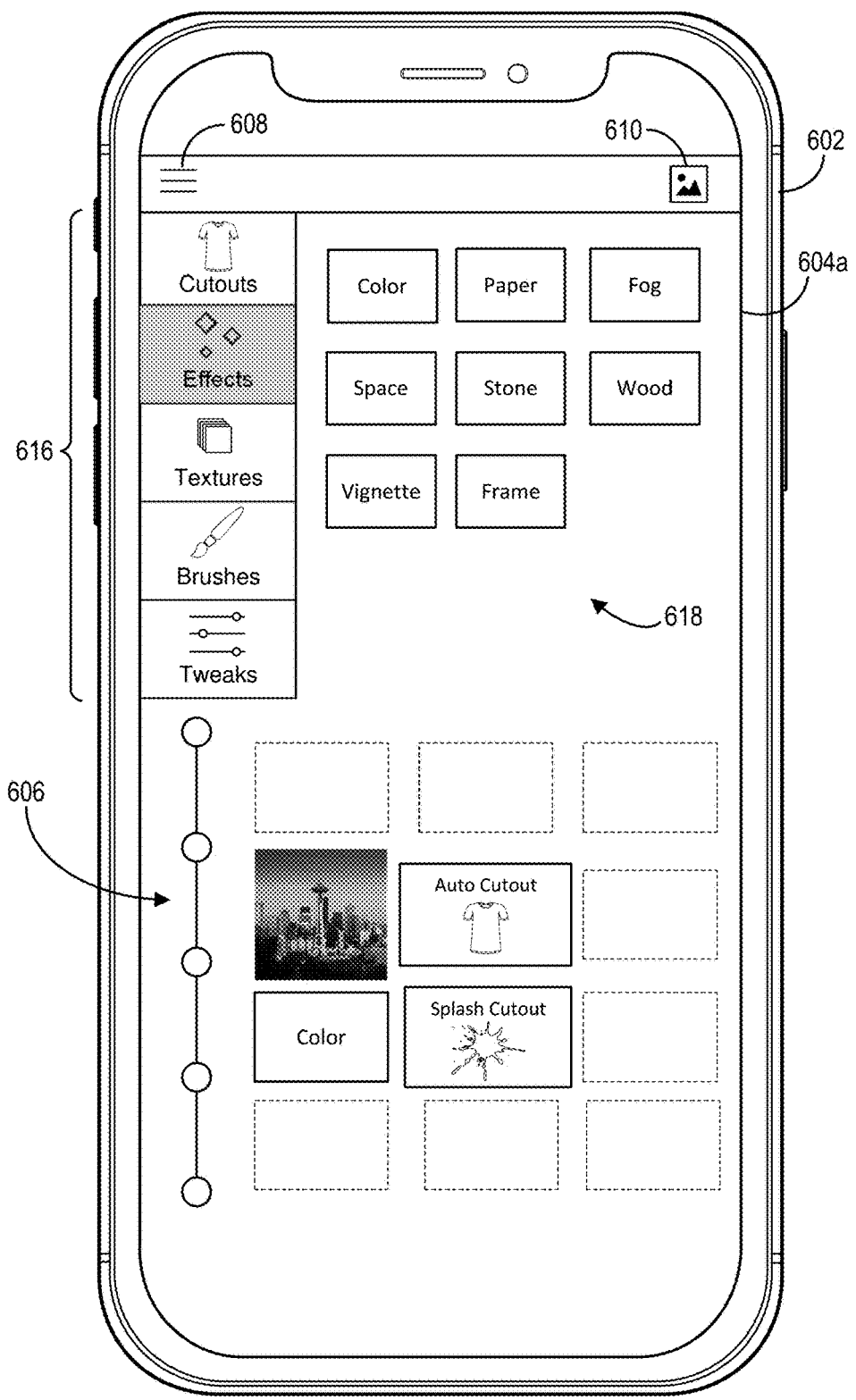
FIGS. 6A-6B illustrate digital editing user interfaces on a computing device for modifying a digital image in accordance with one or more embodiments.
Figure 6B:
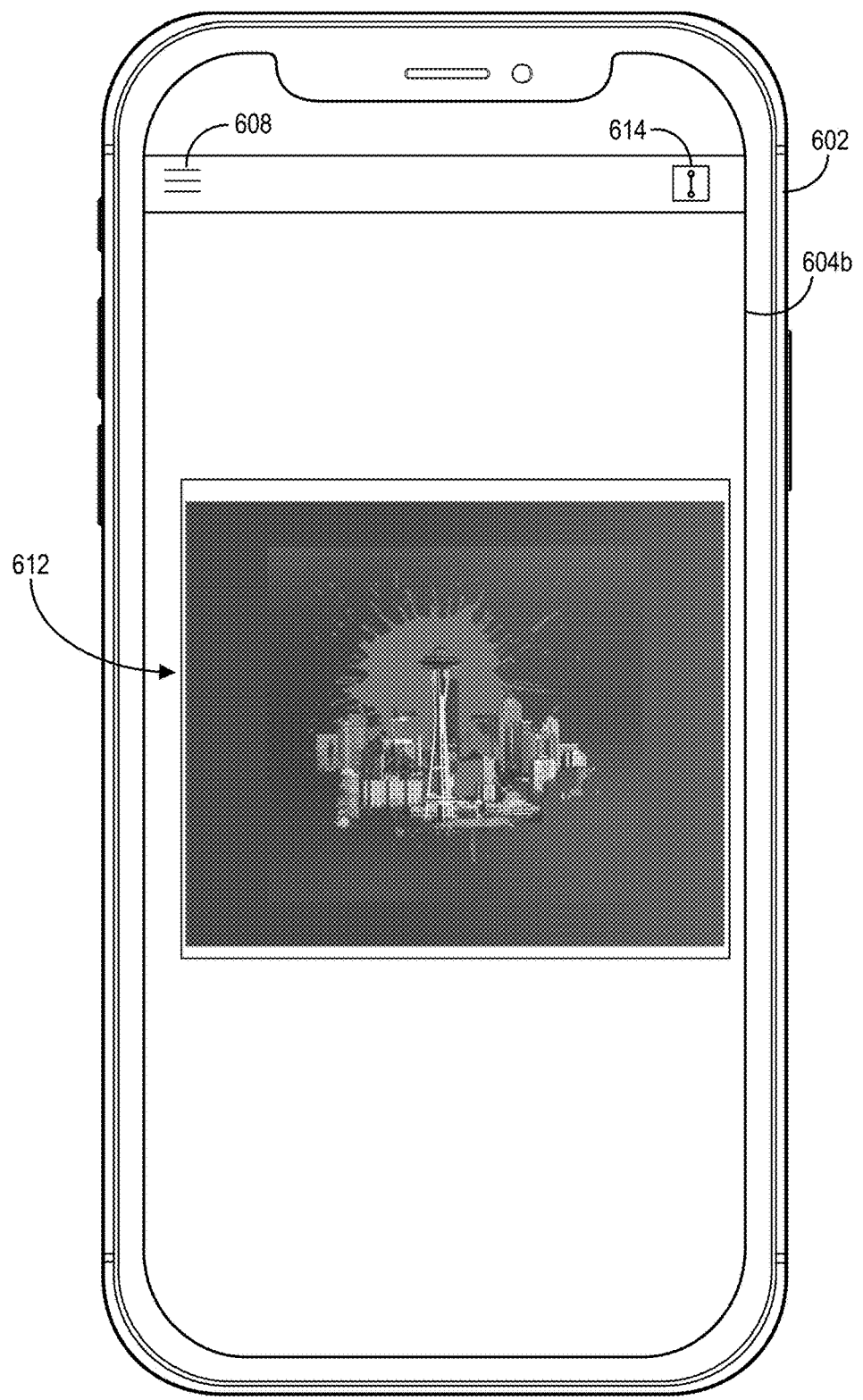

As described in relation to the foregoing figures, the snap effects system 106 can utilize digital editing action blocks and digital editing action categories to modify a digital image. Where FIGS. 5A-5G illustrate example digital editing user interfaces with respect to various types of computing devices, FIGS. 6A-6B illustrate digital editing user interfaces 604a-604b on another computing device 602 for modifying a digital image in accordance with one or more embodiments of the present disclosure. As shown, the snap effects system 106 can provide, for display on the digital editing user interface 604a of the computing device 602, a node compositor 606, navigation elements 608-610, and digital editing action categories 616 and digital editing action blocks 618 for user selection and application at the node compositor 606.

In particular, the node compositor 606 may be the same as or similar to the node compositor 510 as described above in relation to FIGS. 5A-5G. For example, the node compositor 606 comprises a node tree and corresponding fields, some of which are populated with a content block and digital editing action blocks as also described above. Further, in some embodiments, various nodes in the node tree of the node compositor 606 may be selectable (e.g., for selectively presenting or editing a particular portion of the node compositor 606).

Further, the digital editing action categories 616 and the digital editing action blocks 618 may be the same as or similar to the digital editing action categories 506 and the digital editing action blocks 508, respectively, as described above in relation to FIGS. 5A-5G. In particular, the snap effects system 106 configures the digital editing action categories 616 and the digital editing action blocks 618 to be responsive to haptic inputs (e.g., taps, swipes, long-presses, dragging motions, pinching motions, etc.) or other types of inputs, such as voice commands, so as to allow a user to select one of the digital editing action categories 616 and movably arrange one of the digital editing action blocks 618 to the node compositor 606.

In addition, the navigation elements 608-610 help provide the functionality of the snap effects system 106 as described above in relation to the foregoing figures notwithstanding limited screen space for the digital editing user interface 604a. For example, the navigation element 608 is a selectable navigation button that, when selected via a user input, causes the computing device 602 to display various menu options for navigating and/or customizing the snap effects system 106. Similarly, the navigation element 610 is a selectable navigation button that, when selected via a user input, causes the computing device 602 to display the digital editing user interface 604b as shown in FIG. 6B. Alternatively, the snap effects system 106 can switch between the digital editing user interface 604a and 604b via other types of user inputs at the computing device 602, such as a tap, swipe, long-press, etc.

In other embodiments, the node compositor 606 comprises a portion of the node compositor 606 shown in FIG. 6A (e.g., a node-specific set of fields). To accommodate display-size limitations of the computing device 602, the digital editing user interface 604a can include a modified version of the entire node compositor 606. For example, a partial node compositor may depict a certain row of fields that are specific to a particular node or set of nodes of the node tree in the node compositor 606 (e.g., in response to a user selection of one or more nodes at the node tree in the node compositor 606). In this manner, the snap effects system 106 can suitably integrate, with the computing device 602, the various functionalities (e.g., arranging digital editing action blocks, providing indications of compatibility, etc.) that are associated with the node compositor 510 described above in relation to FIGS. 5A-5G.

In FIG. 6B, the digital editing user interface 604b depicts a digital image 612 as modified according to the digital editing action blocks executed in the node compositor 606 of FIG. 6A. Thus, utilizing the digital editing user interface 604b as a rendering window, a user can visually review how the modifications associated with the executed digital editing action blocks appear when applied and rendered in the digital image 612. In addition, the digital editing user interface 604b comprises the navigation element 608 mentioned above and another navigation element 614. The navigation element 614 is a selectable navigation button that, when selected via a user input, causes the computing device 602 to display the digital editing user interface 604a as shown in FIG. 6A. Alternatively, and as mentioned above, the snap effects system 106 can switch between the digital editing user interface 604b and 604a via other types of user inputs at the computing device 602, such as a tap, swipe, long-press, etc.

Figure 7:
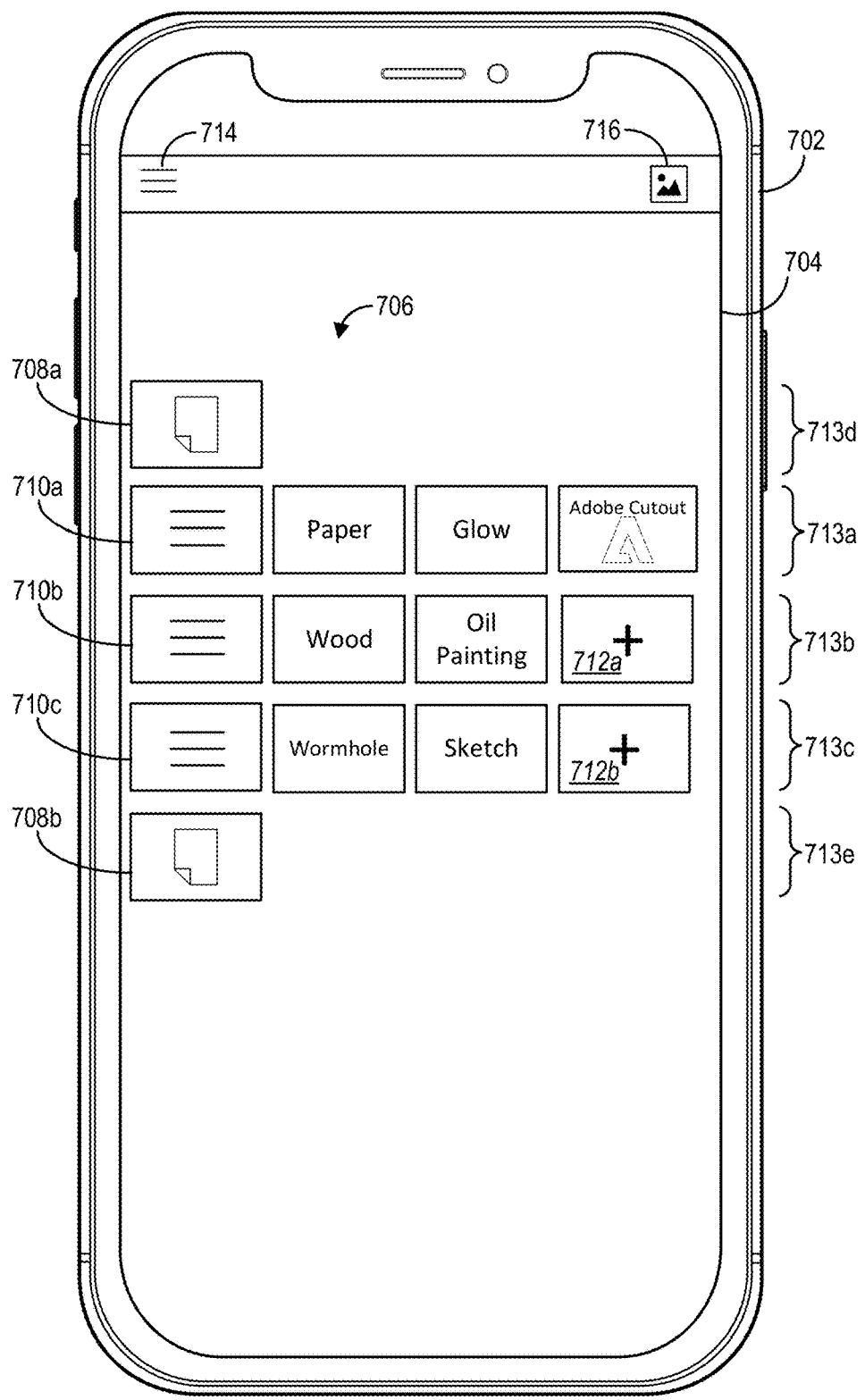
FIG. 7 illustrates a digital editing user interface on a computer device for modifying a digital image in accordance with one or more embodiments.

As described in relation to the foregoing figures, the snap effects system 106 can utilize digital editing action blocks and digital editing action categories to modify a digital image. Where FIGS. 5A-5G and FIGS. 6A-6B illustrate example digital editing user interfaces with respect to various types of computing devices, FIG. 7 illustrates a digital editing user interface 704 on another computing device 702 for modifying a digital image in accordance with one or more embodiments of the present disclosure. As shown, the snap effects system 106 can provide, for display on the digital editing user interface 704 of the computing device 702, a node compositor 706.

In particular, the node compositor 706 may be the same as or similar to the node compositors 510 and 606 as described above in relation to FIGS. 5A-5G and FIG. 6A, respectively. For example, the node compositor 706 comprises a node tree and corresponding fields, some of which are populated with digital editing action blocks and/or content blocks as also described above. However, in FIG. 7, the node tree of the node compositor 706 comprises selectable nodes 710a-710c, in addition to new-node elements 708a-708b.

In more detail, in response to a user input at one or both of the new-node elements 708a-708b, the snap effects system 106 can correspondingly add a new node with associated fields for populating with digital editing action blocks and/or content blocks. For example, based on a user input at the new-node element 708a, the snap effects system 106 can add a row 713d of empty fields above row 713a, which comprises the selectable node 710a, the "paper" digital editing action block, the "glow" digital editing action block, and the "Adobe cutout" digital editing action block. Likewise, based on a user input at the new-node element 708b, the snap effects system 106 can add a row 713e of empty fields below row 713c, which comprises the selectable node 710c, the "wormhole" digital editing action block, the "sketch" digital editing action block, and a field 712b. After receiving such user inputs, in some embodiments, the snap effects system 106 then converts an icon for the new-node elements 708a-708b into an icon for selectable nodes (analogous to the selectable nodes 710a-710c). In turn, the snap effects system 106 can present for display in the digital editing user interface 704 replacement new-node elements above the row 713d and/or below the row 713e. In this manner, the snap effects system 106 can, in response to user inputs, add portions of digital content to a digital image via new nodes above and/or below other portions within the node compositor 706.

Further, with respect to the selectable nodes 710a-710c, the snap effects system 106 can receive one or more user inputs to movably arrange an entire row of both the selected node and the corresponding digital editing action blocks and/or content block(s). For example, in response to a first user input (e.g., a long-press, tap, etc.) at the selectable node 710a, the snap effects system 106 can select the row 713a. Then, in response to a second user input (e.g., a dragging motion) at the selectable node 710a to move the selectable node 710a between the selectable nodes 710b and 710c, the snap effects system 106 can arrange the row 713a. Specifically, the snap effects system 106 can swap the row 713a with the row 713b. Alternatively, the snap effects system 106 can movably arrange one or more of the rows 713a-713c in response to a single user input or several user inputs as applicable. In this manner, the snap effects system 106 can, in response to user inputs at the selectable nodes 710a-710c, rearrange portions of digital content within a digital image.

As additionally shown in FIG. 7, the node compositor 706 includes the fields 712a-712b. In some embodiments, in response to a user input at one or both of the fields 712a-712b (e.g., at a plus ("+") sign), the snap effects system 106 presents, for display within the digital editing user interface 704, one or more digital editing action categories and corresponding digital editing action blocks as described above in relation to the foregoing figures. For example, in response to a user input at the field 712a, the snap effects system 106 can present, for display within the digital editing user interface 704, an overlay comprising one or more digital editing action categories and a first set of corresponding digital editing action blocks that are applicable at (or compatible with) the field 712a. Likewise, in response to a user input at the field 712b, the snap effects system 106 can present, for display within the digital editing user interface 704, an overlay comprising one or more digital editing action categories and a second set of corresponding digital editing action blocks that are applicable at (or compatible with) the field 712b. In these or other embodiments, the first set of digital editing action blocks and the second set of digital editing action blocks may include one or more of the same or different digital editing action blocks, for example, based on one or more compatibility determinations that the snap effects system 106 can perform as described above in relation to FIG. 5B regarding whether one or more of the available (i.e., unpopulated) fields is compatible with the selected digital editing action block. In this manner, the snap effects system 106 can, in response to user inputs at the node compositor 706, insert new digital editing action blocks and/or content blocks as applicable.

Additionally or alternatively, in response to a user input at a digital editing action block already positioned within the node compositor 706, the snap effects system 106 can further rearrange the selected digital editing action block within a corresponding row or to another row of the node compositor 706. For example, the snap effects system 106 can selectively move a digital editing action block in the node compositor 706, in response to one or more user inputs at the digital editing action block, to an available field that is also compatible with the selected digital editing action block (e.g., as described above).

FIG. 7 further illustrates the digital editing user interface 704 comprising navigation elements 714-716, which help provide the functionality of the snap effects system 106 as described above in relation to the foregoing figures notwithstanding limited screen space for the digital editing user interface 704. For example, the navigation element 714 is a selectable navigation button that, when selected via a user input, causes the computing device 702 to display various menu options for navigating and/or customizing the snap effects system 106. Similarly, the navigation element 716 is a selectable navigation button that, when selected via a user input, causes the computing device 702 to display another digital editing user interface (e.g., the digital editing user interface 604b as shown in FIG. 6B) depicting a digital image as modified according to digital editing action blocks executed in the node compositor 706. Alternatively, the snap effects system 106 can switch between the digital editing user interface 704 and other digital editing user interfaces via other types of user inputs at the computing device 702, such as a tap, swipe, long-press, etc.

Figure 8:
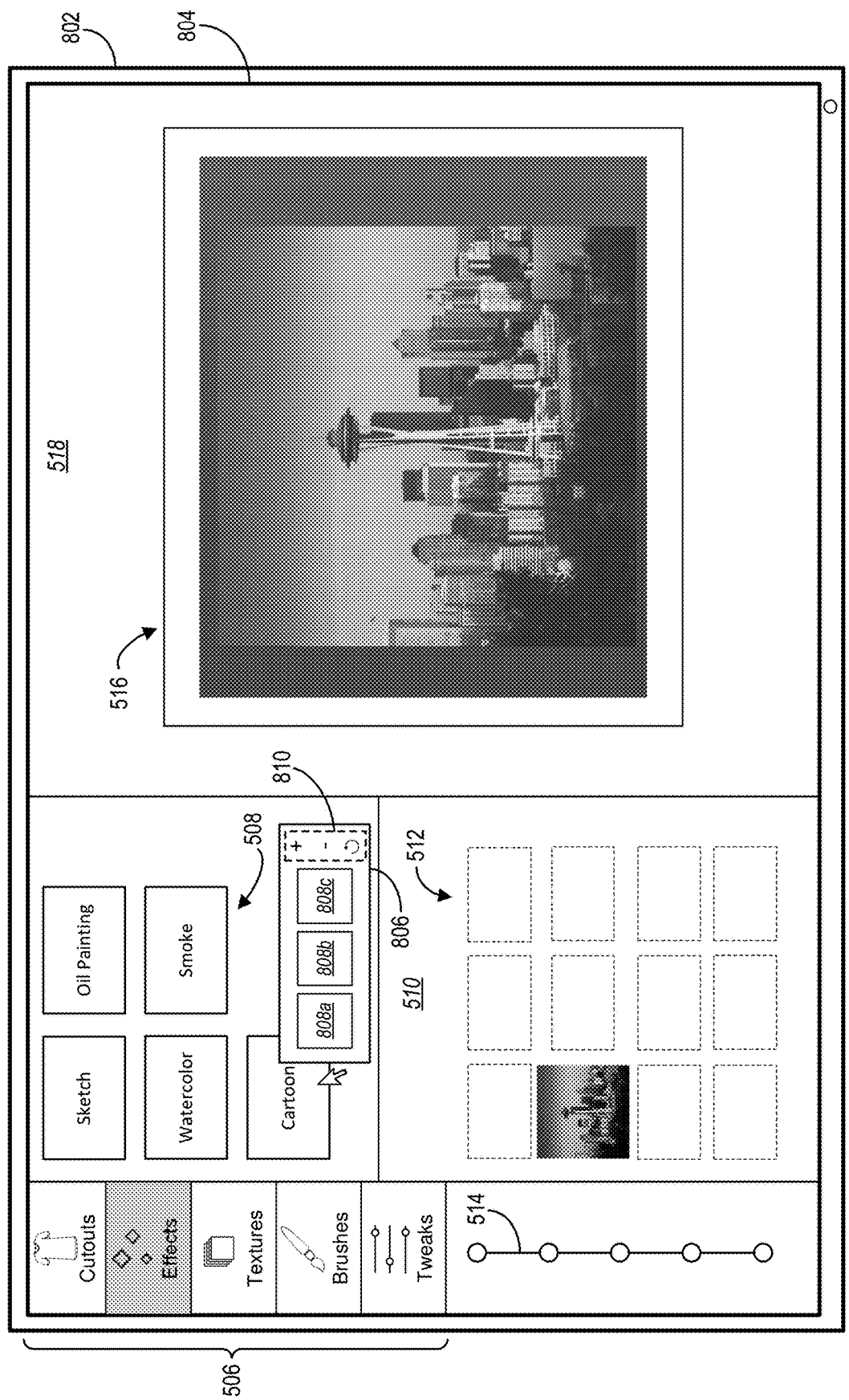
FIG. 8 illustrates a digital editing user interface on a computing device for modifying a digital image in accordance with one or more embodiments.

As mentioned above, the snap effects system 106 facilitates use of a variety of different types of digital editing action blocks. In particular, some digital editing action blocks, such as nested action blocks, include a subset of digital editing action blocks grouped together. FIG. 8 illustrates a digital editing user interface 804 on a computing device 802 for modifying the digital image 516 in accordance with one or more embodiments of the present disclosure. As shown in FIG. 8, the digital editing user interface 804 may be similar to the digital editing user interface 504a and includes the digital editing action categories 506, the digital editing action blocks 508, the node compositor 510, the fields 512, the node tree 514, and the rendering window 518, each described above in relation to at least FIG. 5A.

In addition, one of the digital editing action blocks 508 (in this instance, the cartoon effect action block illustrated as a nested action block 806) is a nested action block 806 which includes a subset of digital editing action blocks 808a-808c. In some embodiments, the snap effects system 106 may nest the subset of digital editing action blocks 808a-808c in the nested action block 806 based on the manner in which the snap effects system 106 defines (i.e., creates) the nested action block 806 and/or based on the categorization analysis 408 described above in relation to FIG. 4. Additionally or alternatively, the snap effects system 106 may nest the subset of digital editing action blocks 808a-808c in the nested action block 806 according to the manner in which a user defines the nested action block 806. For example, a user may discover a pattern of action-block usage in performing a particular modification that includes the subset of digital editing action blocks 808a-808c, and the user may correspondingly group the digital editing action blocks together as the nested action block 806. For instance, the nested action block 806 may comprise a higher-level digital editing action block, i.e., the cartoon effect that combines an outline digital editing action block, a posterization digital editing action block, a vibrance adjustment digital editing action block, and so forth.

Further, the snap effects system 106 provides, for display within the digital editing user interface 804, the nested action block 806 comprising selectable options 810 for adding to, deleting, or replacing a digital editing action block of the subset of digital editing action blocks 808a-808c. For example, in response to a user input at the plus ("+") sign of the selectable options 810, the snap effects system 106 can add another block to the subset of digital editing action blocks 808a-808c (e.g., at a user's preference). Similarly, in response to a user input at the minus ("−") sign of the selectable options 810, the snap effects system 106 can delete one or more of the digital editing action blocks of the subset of digital editing action blocks 808a-808c (e.g., at the user's preference). Likewise, in response to a user input at the circular arrow ("↻") icon of the selectable options 810, the snap effects system 106 can replace one or more of the digital editing action blocks of the subset of digital editing action blocks 808a-808c (e.g., at the user's preference).

Figure 9A:
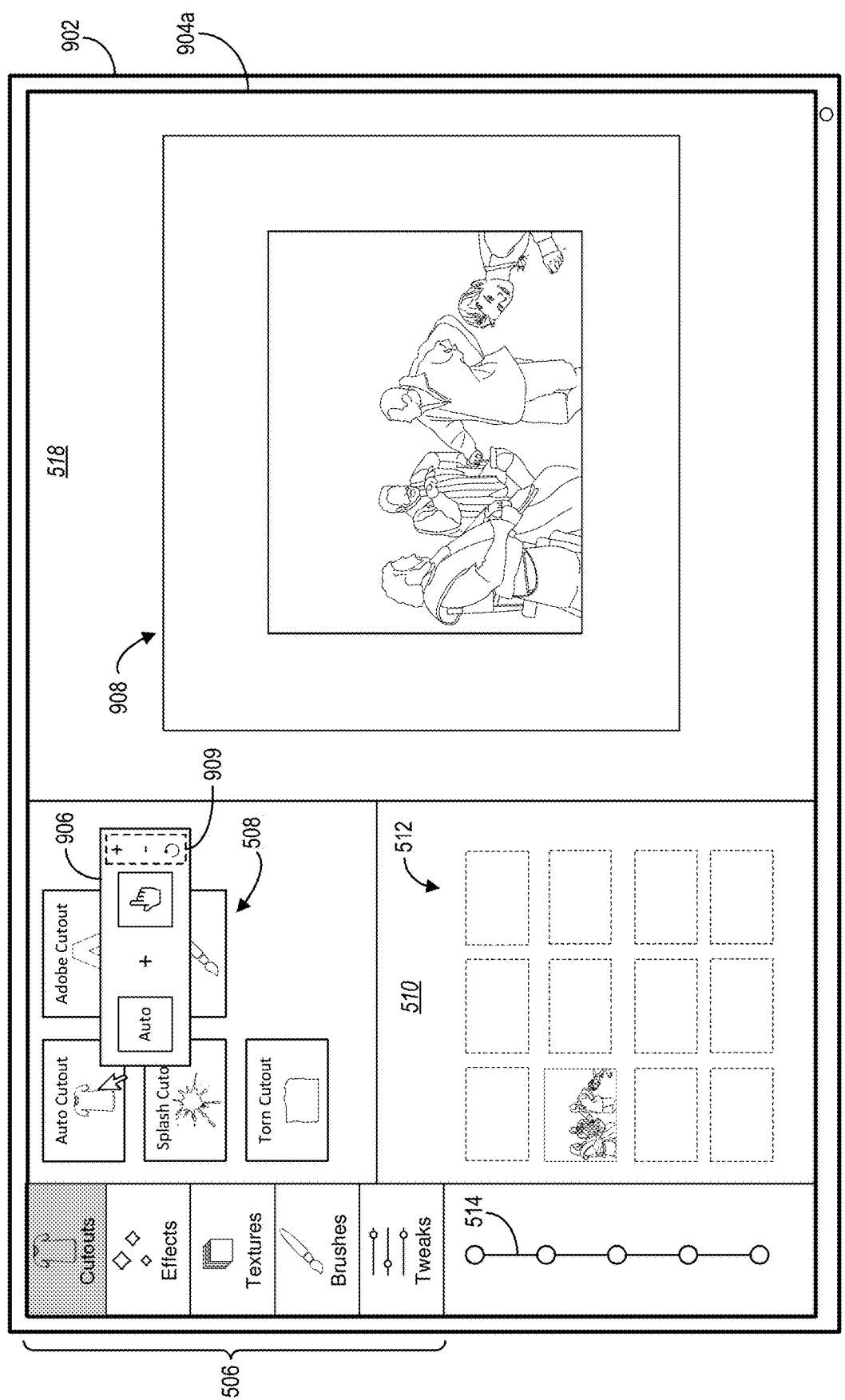
FIGS. 9A-9C illustrate digital editing user interfaces on a computing device for modifying a digital image in accordance with one or more embodiments.
Figure 9B:
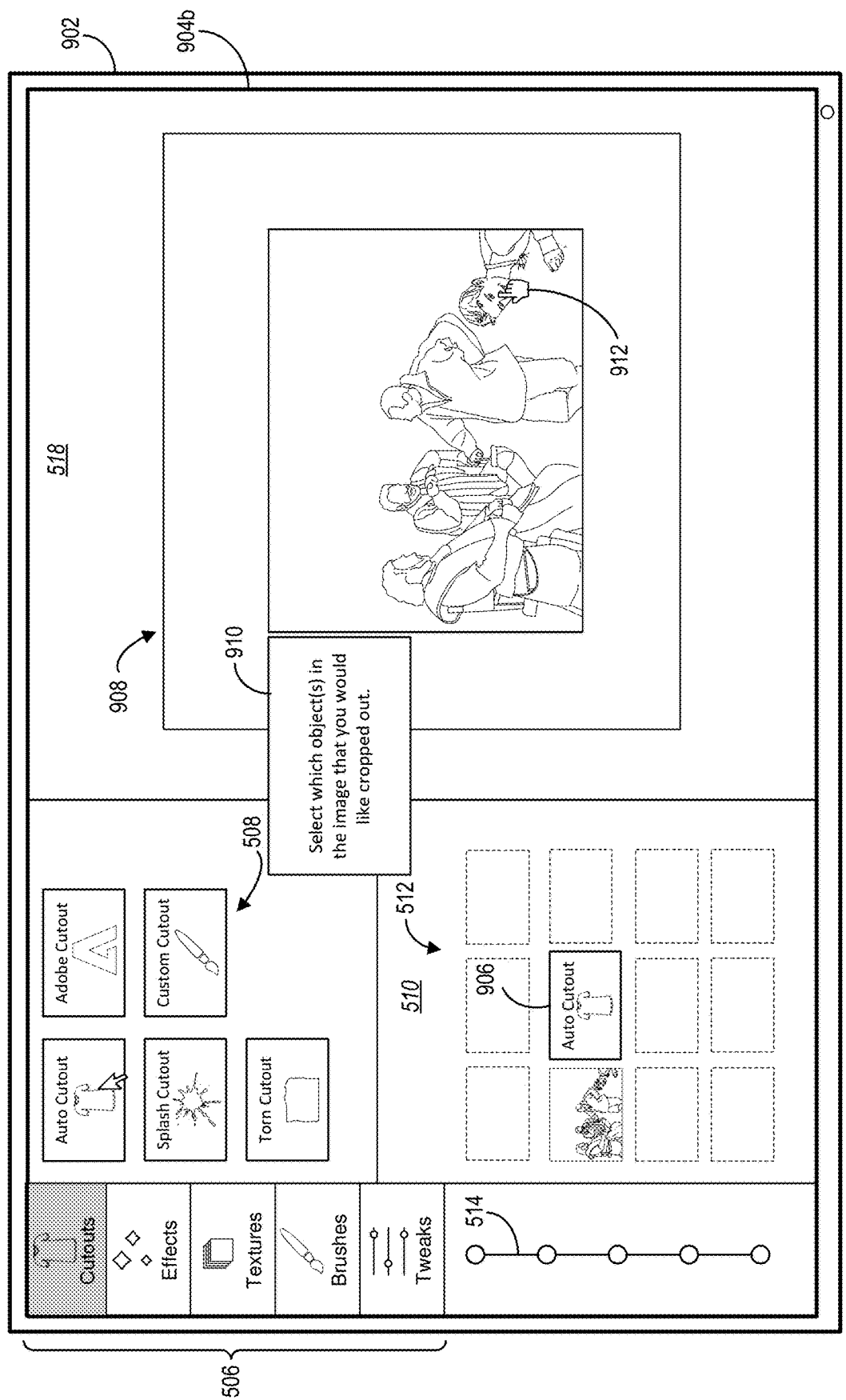
Figure 9C:
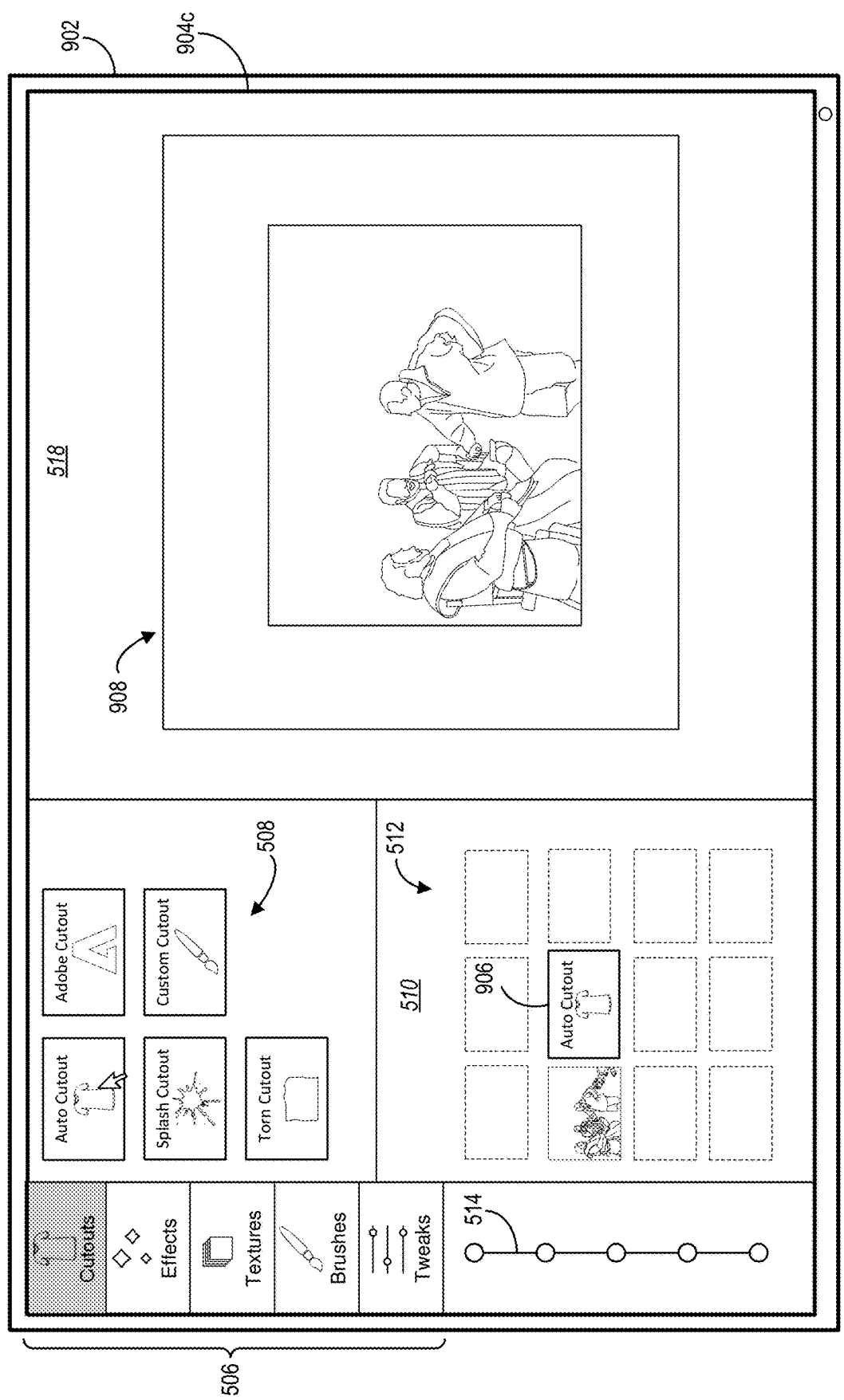

As mentioned above, the snap effects system 106 facilitates use of a variety of different types of digital editing action blocks. In particular, some digital editing action blocks, such as workflow action blocks, include one or more digital editing action blocks operable in conjunction with a user input. FIGS. 9A-9C illustrate digital editing user interfaces 904a-904c on a computing device 902 for modifying a digital image 908 in accordance with one or more embodiments of the present disclosure. As shown in FIGS. 9A-9C, the digital editing user interfaces 904a-904c may be similar to the digital editing user interface 504a and include the digital editing action categories 506, the digital editing action blocks 508, the node compositor 510, the fields 512, the node tree 514, and the rendering window 518, each described above in relation to at least FIG. 5A.

With respect to FIG. 9A, the digital editing user interface 904a additionally includes a workflow action block 906 (i.e., the auto cutout action block) among the digital editing action blocks 508. As indicated in the workflow action block 906, the workflow action block 906 includes the auto cutout action block, which is operable in conjunction with a user input as denoted by the hand ("👆") icon. In these or other embodiments, the snap effects system 106 may cause the computing device 902 to display the workflow action block 906 (e.g., as overlaid over the other digital editing action blocks 508) in response to a user input at the auto cutout action block, or else in response to positioning a cursor or finger over the auto cutout action block.

Further, the workflow action block 906 comprises selectable options 909 for adding to, deleting, or replacing a digital editing action block in the workflow action block 906. For example, in response to a user input at the plus ("+") sign of the selectable options 909, the snap effects system 106 can add another block to the workflow action block 906 (e.g., to create a more robust workflow at the user's preference). Similarly, in response to a user input at the minus ("−") sign of the selectable options 909, the snap effects system 106 can delete one or more of the digital editing action blocks of the workflow action block 906 (e.g., to simplify the workflow at the user's preference). Likewise, in response to a user input at the circular arrow ("↻") icon of the selectable options 909, the snap effects system 106 can replace one or more of the digital editing action blocks of the workflow action block 906 (e.g., at the user's preference).

In FIG. 9B, the digital editing user interface 904b illustrates, in addition to elements of FIG. 9A, a prompt 910 in response to a user input to movably arrange the workflow action block 906 into the node compositor 510. In particular, the snap effects system 106 can execute a first portion of the workflow action block 906 (e.g., to begin an auto cutout of the digital image 908). Then, the snap effects system 106 can provide, for display within the digital editing user interface 904b of the computing device 902, the prompt 910 requesting the user to provide a user input for completing a second portion of the workflow action block 906. In these or other embodiments, the snap effects system 106 configures the text of the prompt 910 based on the nature of the workflow action block 906 (e.g., the particular digital editing action block(s) included therein). Accordingly, for the workflow action block 906 in this instance with an auto cutout action block, the prompt 910 requests a user input to inform the snap effects system 106 of which object the snap effects system 106 should crop out (e.g., a photobomber not intended for capturing in the digital image 908). In response to the prompt, the snap effects system 106 can receive a user input 912 at the object desired for removal during execution of the second portion of the workflow action block 906.

FIG. 9C accordingly illustrates, in addition to elements of FIGS. 9A-9B just described, the digital editing user interface 904c comprising the digital image 908 with the selected object (i.e., the photobomber) removed. Thus, in response to executing a second portion of the workflow action block 906 based on the user input 912 via the digital editing user interface 904b of FIG. 9B, the digital editing user interface 904c illustrates that the snap effects system 106 correspondingly modifies the digital image 908 to remove the selected object. Thus, for workflow action blocks as described herein, the snap effects system 106 executes a first portion of the workflow action block and utilizes a user input to execute a second portion of the workflow action block.

Although a particular example of the workflow action block 906 is described with respect to FIGS. 9A-9C, in other embodiments, different workflow action blocks are herein contemplated. For example, the workflow action block 906 may include multiple, differing digital editing action blocks and multiple requests for user inputs in a variety of combinations and orderings thereof. As an example, the workflow action block 906 may comprise a cutout action block, a replacement digital editing action block, and a blending digital editing action block. To execute the workflow action block 906 in this example, the snap effects system 106 can begin execution of the cutout action block, request a user input to select a portion of the image to cutout, and complete execution of the cutout action block based on the user input selection. Continuing with the workflow, the snap effects system 106 can begin execution of the replacement digital editing action block, request a user input to select a portion of the digital image to replace with replacement content, and complete execution of the replacement digital editing action block based on the user input selection and replacement content. Continuing still with the workflow, the snap effects system 106 can begin execution of the blending digital editing action block, request a user input to select a portion of the digital image to smooth, and complete execution of the blending digital editing action block based on the user input selection. In this manner, the snap effects system 106 can execute a workflow action block 906, including those with more complex workflows, by guiding a user through the various steps of the workflow to completion. Similarly, in some embodiments, the snap effects system 106 facilitates workflow action blocks in a tutorial mode to guide users through steps in modifying a digital image. Further, in some embodiments, the snap effects system 106 facilitates general image-editing techniques using workflow action blocks.

Figure 10:
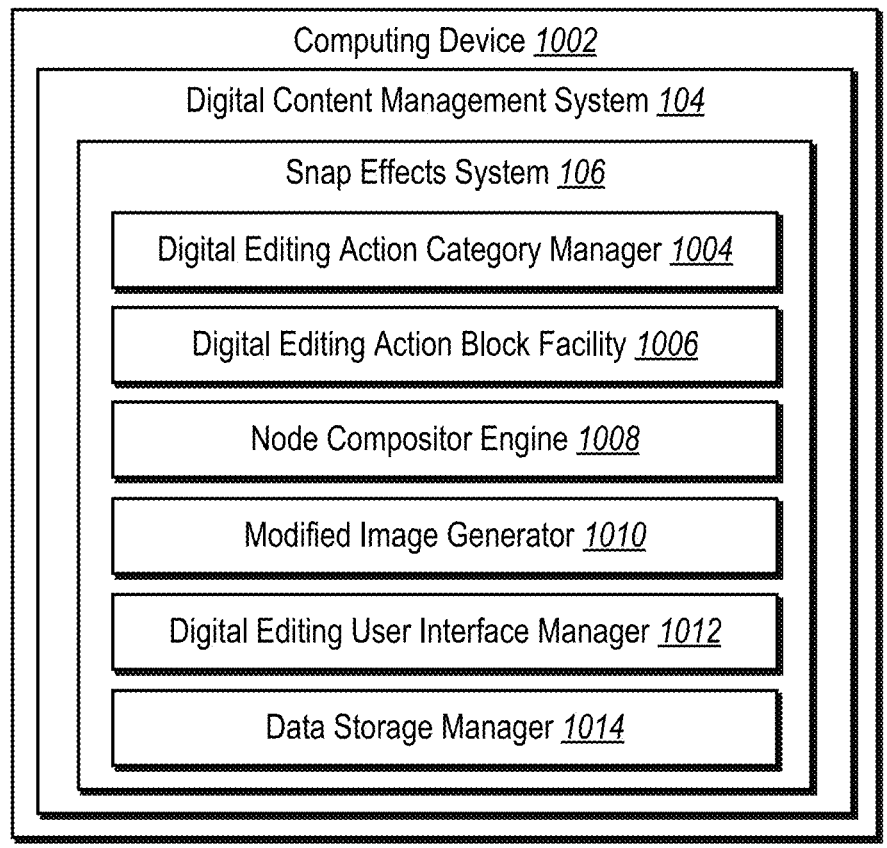
FIG. 10 illustrates a schematic diagram of the snap effects system implemented by a computing device of a computing system in accordance with one or more embodiments.

Turning to FIG. 10, additional detail will now be provided regarding various components and capabilities of the snap effects system 106. In particular, FIG. 10 illustrates an example schematic diagram of the snap effects system 106 implemented by a computing device 1002 (e.g., the server(s) 102 and/or the client device 108a) of a computing system in accordance with one or more embodiments of the present disclosure. As shown, the snap effects system 106 is further implemented by the digital content management system 104. Also illustrated, the snap effects system 106 can include a digital editing action category manager 1004, a digital editing action block facility 1006, a node compositor engine 1008, a modified image generator 1010, a digital editing user interface manager 1012, and a data storage manager 1014.

The digital editing action category manager 1004 can generate, apply, send, receive, process, and/or analyze digital editing action categories for grouping digital editing action blocks as described in relation to the foregoing figures. For example, the digital editing action category manager 1004 can categorize digital editing action blocks, including system-defined and user-defined digital editing action blocks provided by the digital editing action block facility 1006, into specific digital editing action categories. In particular, the digital editing action category manager 1004 can sort, perform pre-processing, and/or tag the digital editing action blocks according to digital editing action categories. Additionally or alternatively, the digital editing action category manager 1004 can relay sorted/tagged digital editing action blocks to the digital editing action block facility 1006.

The digital editing action block facility 1006 can generate, obtain, send, receive, process, store, and/or analyze digital editing action blocks for modifying digital images as described in relation to the foregoing figures. For example, the digital editing action block facility 1006 can handle generating the system-defined digital editing action blocks and obtaining from users the user-defined digital editing action blocks. In particular, the digital editing action block facility 1006 can receive user-defined digital editing action blocks shared by users of the snap effects system 106. In addition, the digital editing action block facility 1006 can handle the storing of digital editing action blocks, including action-block configurations specific to client devices of the snap effects system 106 (e.g., for reuse/application to other digital images, subsequent sharing, and/or mixing and matching with other digital editing action blocks).

The node compositor engine 1008 can obtain, receive process, store, analyze, and/or execute digital editing action blocks configured for placement in fields of the node compositor as described in relation to the foregoing figures. For example, the node compositor engine 1008 can determine a compatibility between one or more digital editing action blocks in response to a user selection of a particular digital editing action block for positioning within the node compositor. In particular, the node compositor engine 1008 can analyze one or more rules and/or computer-executable instructions embedded into the digital editing action blocks in order to determine whether a given digital editing action block is compatible with one or more digital editing action blocks placed in specific fields. In addition, the node compositor engine 1008 can transmit instructions to the digital editing user interface manager 1012 regarding the presentation of an indication of compatibility (or incompatibility) to a client device. Further, the node compositor engine 1008 can transmit instructions to the modified image generator 1010 regarding execution of one or more digital editing action blocks positioned in the node compositor to modify a digital image.

The modified image generator 1010 can obtain, send, receive, process, and/or analyze requests to generate modified digital images (and accordingly do so) based on executed digital editing action blocks as described in relation to the foregoing figures. For example, the modified image generator 1010 can receive instructions from the node compositor engine 1008 regarding the execution of one or more digital editing action blocks positioned in a particular field of the node compositor. Based on the instructions received, the modified image generator 1010 can apply modifications to a digital image (e.g., apply a "sketch" effect, a "pen" effect, a "splash" cutout, a "red" color or texture, a "watercolor" brush, etc.). In addition, the modified image generator 1010 can, in coordination with the digital editing user interface manager 1012, render a modified image for display in a digital editing user interface of a client device. In other embodiments, the modified image generator 1010 provides rendering instructions to the digital editing user interface manager 1012 based on the modifications applied to the digital image.

The digital editing user interface manager 1012 can provide, manage, and/or control a graphical user interface (or simply "user interface") of a client device as described in relation to the foregoing figures. In particular, the digital editing user interface manager 1012 may generate and display a user interface by way of a display screen composed of a plurality of graphical components, objects, and/or elements that allow a user to perform a function and/or depict modified digital images. For example, the digital editing user interface manager 1012 can receive user inputs from a user, such as a drag-and-drop type of user input to movably arrange a digital editing action block within the node compositor. Further, the digital editing user interface manager 1012 can render or otherwise coordinate the rendering of a modified digital image as generated by the modified image generator 1010. Additionally, the digital editing user interface manager 1012 can present a variety of types of information, including text, digital media items, interactive media (e.g., digital editing action blocks), or other information.

The data storage manager 1014 maintains data for the snap effects system 106. The data storage manager 1014 (e.g., via one or more memory devices) can maintain data of any type, size, or kind, as necessary to perform the functions of the snap effects system 106, including digital images, digital editing action blocks, digital editing action categories, etc.

Each of the components of the computing device 1002 can include software, hardware, or both. For example, the components of the computing device 1002 can include one or more instructions stored on a computer-readable storage medium and executable by processors of one or more computing devices, such as a client device or server device. When executed by the one or more processors, the computer-executable instructions of the snap effects system 106 can cause the computing device(s) (e.g., the computing device 1002) to perform the methods described herein. Alternatively, the components of the computing device 1002 can include hardware, such as a special-purpose processing device to perform a certain function or group of functions. Alternatively, the components of the computing device 1002 can include a combination of computer-executable instructions and hardware.

Furthermore, the components of the computing device 1002 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 1002 may be implemented as a stand-alone application, such as a desktop or mobile application. Furthermore, the components of the computing device 1002 may be implemented as one or more web-based applications hosted on a remote server.

The components of the computing device 1002 may also be implemented in a suite of mobile device applications or "apps." To illustrate, the components of the computing device 1002 may be implemented in an application, including but not limited to ADOBE® PHOTOSHOP, ADOBE® LIGHTROOM, ADOBE® ILLUSTRATOR, ADOBE® AFTER EFFECTS, ADOBE® DIMENSION, ADOBE® SPARK, or other ADOBE® CREATIVE CLOUD products. Product names, including "ADOBE" and any other portion of one or more of the foregoing product names, may include registered trademarks or trademarks of Adobe Inc. in the United States and/or other countries.

Figure 11A:
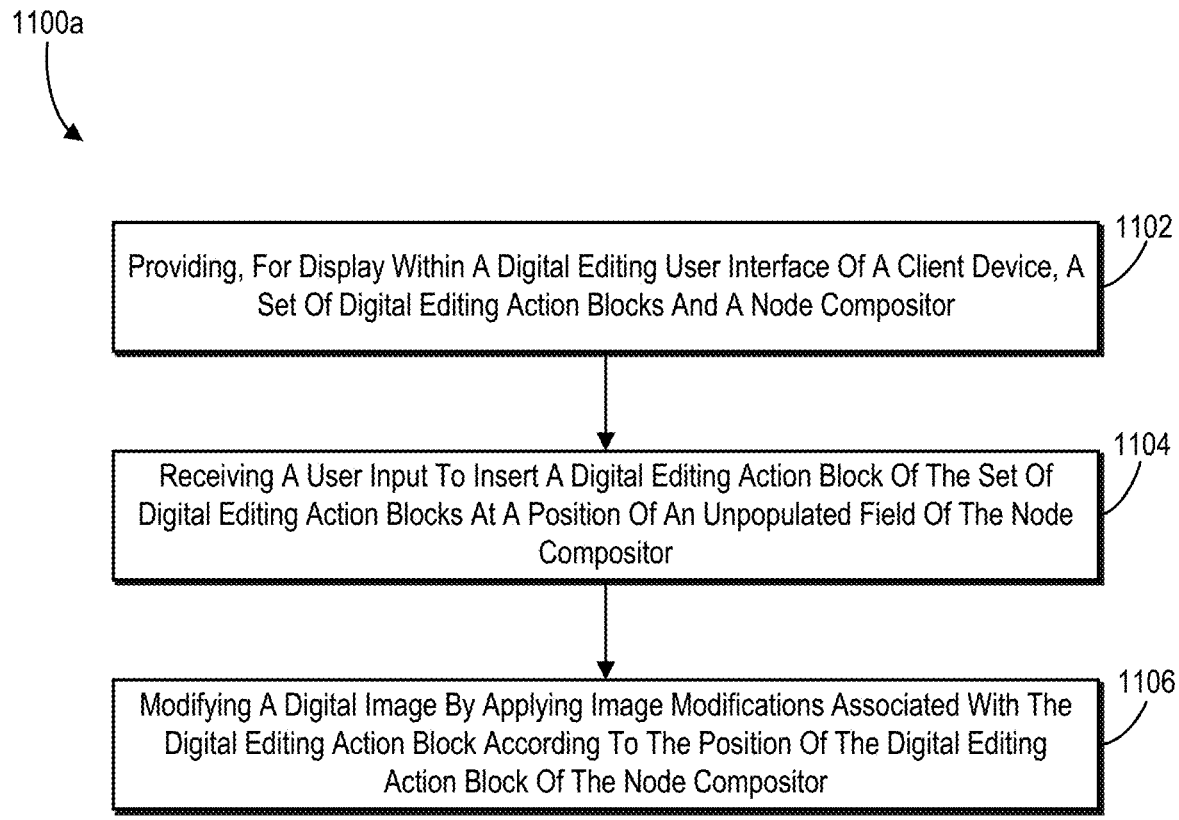
FIGS. 11A-11C illustrate flowcharts for modifying a digital image based on digital editing action blocks in accordance with one or more embodiments.
Figure 11B:
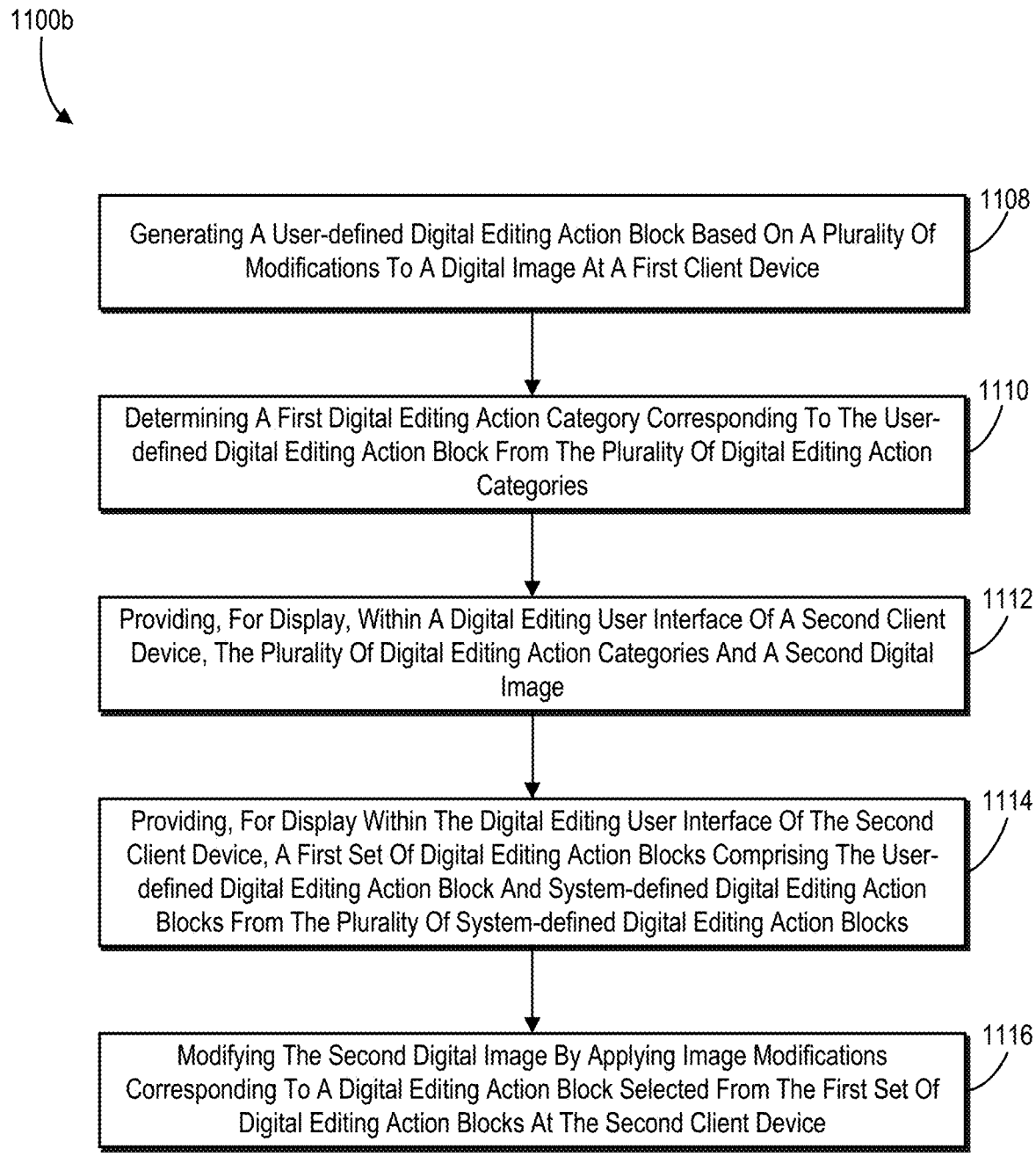
Figure 11C:
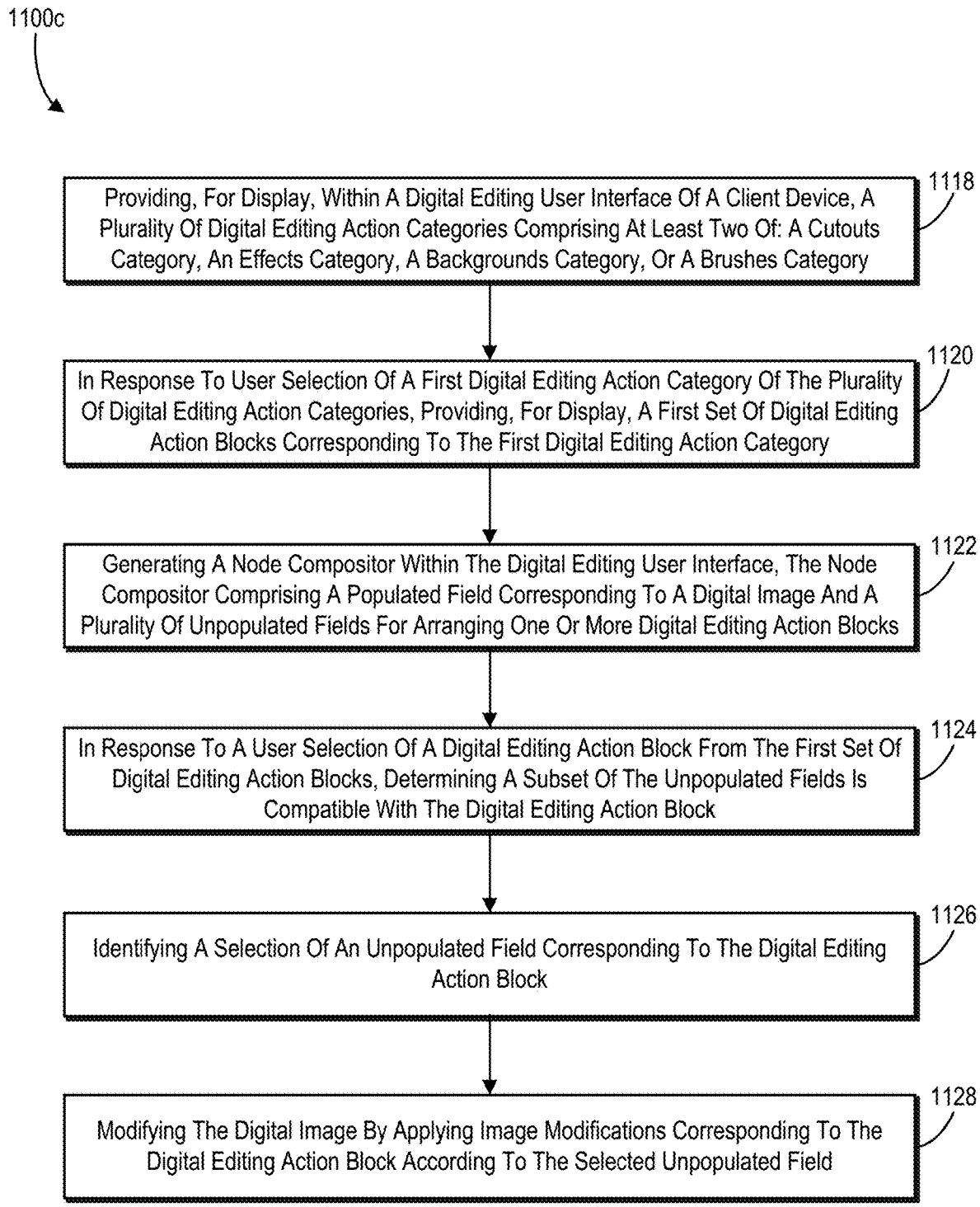

FIGS. 1-10, the corresponding text, and the examples provide several different systems, methods, techniques, components, and/or devices of the snap effects system 106 in accordance with one or more embodiments. In addition to the above description, one or more embodiments can also be described in terms of flowcharts including acts for accomplishing a particular result. For example, FIGS. 11A-11C illustrate respective flowcharts of a series of acts 1100a-1100c for modifying a digital image based on action blocks in accordance with one or more embodiments. The snap effects system 106 may perform one or more acts of the series of acts 1100a-1100c in addition to or alternatively to one or more acts described in conjunction with other figures. While FIGS. 11A-11C illustrates acts according to one embodiment, alternative embodiments may omit, add to, reorder, and/or modify any of the acts shown in FIGS. 11A-11C. The acts of FIGS. 11A-11C can be performed as part of a method. Alternatively, a non-transitory computer-readable medium can comprise instructions that, when executed by one or more processors, cause a computing device to perform the acts of FIGS. 11A-11C. In some embodiments, a system can perform the acts of FIGS. 11A-11C.

As shown in FIG. 11A, the series of acts 1100a includes an act 1102 of providing, for display within a digital editing user interface of a client device a set of digital editing action blocks comprising user-defined digital editing action blocks and system-defined digital editing action blocks; and a node compositor comprising a plurality of unpopulated fields configured to receive one or more digital editing action blocks of the set of digital editing action blocks. In these or other embodiments, providing the set of digital editing action blocks comprises providing, for display within the digital editing user interface, the set of digital editing action blocks in association with a digital editing action category of a plurality of digital editing action categories that includes at least two of: a cutouts category, an effects category, a backgrounds category, or a brushes category. Additionally, in some embodiments, the digital editing action block is a nested action block comprising a subset of digital editing action blocks, and each digital editing action block in the subset of digital editing action blocks of the nested action block is configured to be deleted or replaced with a different digital editing action block in response to a user input. Further, in some embodiments, the digital editing action block comprises a workflow action block operable in conjunction with a user input.

Further, the series of acts 1100a includes an act 1104 of receiving a user input to insert a digital editing action block of the set of digital editing action blocks at a position of an unpopulated field of the node compositor. In these or other embodiments, the node compositor further comprises fields positionally arranged in a first direction indicating portions of digital content and positioned in a second direction indicating modifications to the portions of digital content. In addition, the series of acts 1100a includes an act 1106 of modifying a digital image by applying image modifications associated with the digital editing action block according to the position of the digital editing action block of the node compositor.

It is understood that the outlined acts in the series of acts 1100a are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of one or more additional or alternative acts not shown in FIG. 11A, act(s) in the series of acts 1100a may include: identifying a plurality of modifications to another digital image at a second client device; generating at least one of the user-defined digital editing action blocks to reflect the plurality of modifications; and determining the at least one user-defined digital editing action block corresponds to one or more digital editing action categories of a plurality of digital editing action categories.

As another example of one or more additional or alternative acts not shown in FIG. 11A, act(s) in the series of acts 1100a may include: in response to the user input to insert the digital editing action block, determining that one or more fields of the plurality of unpopulated fields is compatible with the digital editing action block; and providing, for display within the digital editing user interface of the client device, an indication of compatibility for the one or more fields of the plurality of unpopulated fields.

In yet another example of one or more additional or alternative acts not shown in FIG. 11A, act(s) in the series of acts 1100a may include: executing a first portion of the workflow action block; providing, for display within the digital editing user interface of the client device, a prompt for a user input; and executing a second portion of the workflow action block based on receipt of the user input at the digital editing user interface of the client device.

With respect to FIG. 11B, the series of acts 1100b includes an act 1108 of generating a user-defined digital editing action block based on a plurality of modifications to a digital image at a first client device. In some embodiments, the digital editing action block is a nested action block comprising a subset of digital editing action blocks, each digital editing action block in the subset of digital editing action blocks configured to be deleted or replaced with a different digital editing action block in response to a user input. Further, in some embodiments, the digital editing action block comprises a workflow action block operable in conjunction with a user input.

In addition, the series of acts 1100b includes an act 1110 of determining a first digital editing action category corresponding to the user-defined digital editing action block from the plurality of digital editing action categories. In these or other embodiments, the plurality of digital editing action categories includes at least two of: a cutouts category, an effects category, a backgrounds category, or a brushes category.

Further, the series of acts 1100b includes an act 1112 of providing, for display, within a digital editing user interface of a second client device, the plurality of digital editing action categories and a second digital image. Additionally, the series of acts 1100b includes an act 1114 of, in response to selection of the first digital editing action category, providing, for display within the digital editing user interface of the second client device, a first set of digital editing action blocks comprising the user-defined digital editing action block and system-defined digital editing action blocks from the plurality of system-defined digital editing action blocks. The series of acts 1100b also includes an act 1116 of modifying the second digital image by applying image modifications corresponding to a digital editing action block selected from the first set of digital editing action blocks at the second client device.

It is understood that the outlined acts in the series of acts 1100b are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of one or more additional or alternative acts not shown in FIG. 11B, act(s) in the series of acts 1100b may include: generating a node compositor within the digital editing user interface of the second client device, the node compositor comprising a plurality of unpopulated fields for arranging digital editing action blocks; in response to the user selection of the digital editing action block, determining that one or more fields of the plurality of unpopulated fields is compatible with the digital editing action block; and providing, for display within the digital editing user interface of the second client device, an indication of compatibility for the one or more fields of the plurality of unpopulated fields.

As another example of one or more additional or alternative acts not shown in FIG. 11B, act(s) in the series of acts 1100b may include: executing a first portion of the workflow action block; providing, for display within the digital editing user interface of the second client device, a prompt for a user input; and executing a second portion of the workflow action block based on receipt of the user input at the digital editing user interface of the second client device.

With respect to FIG. 11C, the series of acts 1100c includes an act 1118 of providing, for display, within a digital editing user interface of a client device, a plurality of digital editing action categories comprising at least two of: a cutouts category, an effects category, a backgrounds category, or a brushes category. In addition, the series of acts 1100c includes an act 1120 of, in response to user selection of a first digital editing action category of the plurality of digital editing action categories, providing, for display, a first set of digital editing action blocks corresponding to the first digital editing action category.

Further, the series of acts 1100c includes an act 1122 of generating a node compositor within the digital editing user interface, the node compositor comprising a populated field corresponding to a digital image and a plurality of unpopulated fields for arranging one or more digital editing action blocks. Additionally, the series of acts 1100c includes an act 1124 of in response to a user selection of a digital editing action block from the first set of digital editing action blocks, determining a subset of the unpopulated fields is compatible with the digital editing action block. In some embodiments, the digital editing action block is a nested action block comprising a subset of digital editing action blocks, each digital editing action block in the subset of digital editing action blocks configured to be deleted or replaced with a different digital editing action block in response to a user input. Further, in some embodiments, the digital editing action block comprises a workflow action block operable in conjunction with a user input.

The series of acts 1100c also includes an act 1126 of identifying a selection of an unpopulated field corresponding to the digital editing action block. The series of acts 1100c further includes an act 1128 of modifying the digital image by applying image modifications corresponding to the digital editing action block according to the selected unpopulated field.

It is understood that the outlined acts in the series of acts 1100c are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of one or more additional or alternative acts not shown in FIG. 11C, act(s) in the series of acts 1100c may include: generating one or more user-defined digital editing action blocks based on a plurality of modifications to another digital image at a second client device, wherein the client device of act 1118 is a first client device; and determining the one or more user-defined digital editing action blocks correspond to one or more digital editing action categories of the plurality of digital editing action categories.

As another example of one or more additional or alternative acts not shown in FIG. 11C, act(s) in the series of acts 1100c may include providing, for display within the digital editing user interface of the client device, an indication of compatibility for the subset of the unpopulated fields. In yet another example of one or more additional or alternative acts not shown in FIG. 11C, act(s) in the series of acts 1100c may include: executing a first portion of the workflow action block; providing, for display within the digital editing user interface of the client device, a prompt for a user input; and executing a second portion of the workflow action block based on receipt of the user input at the digital editing user interface of the client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
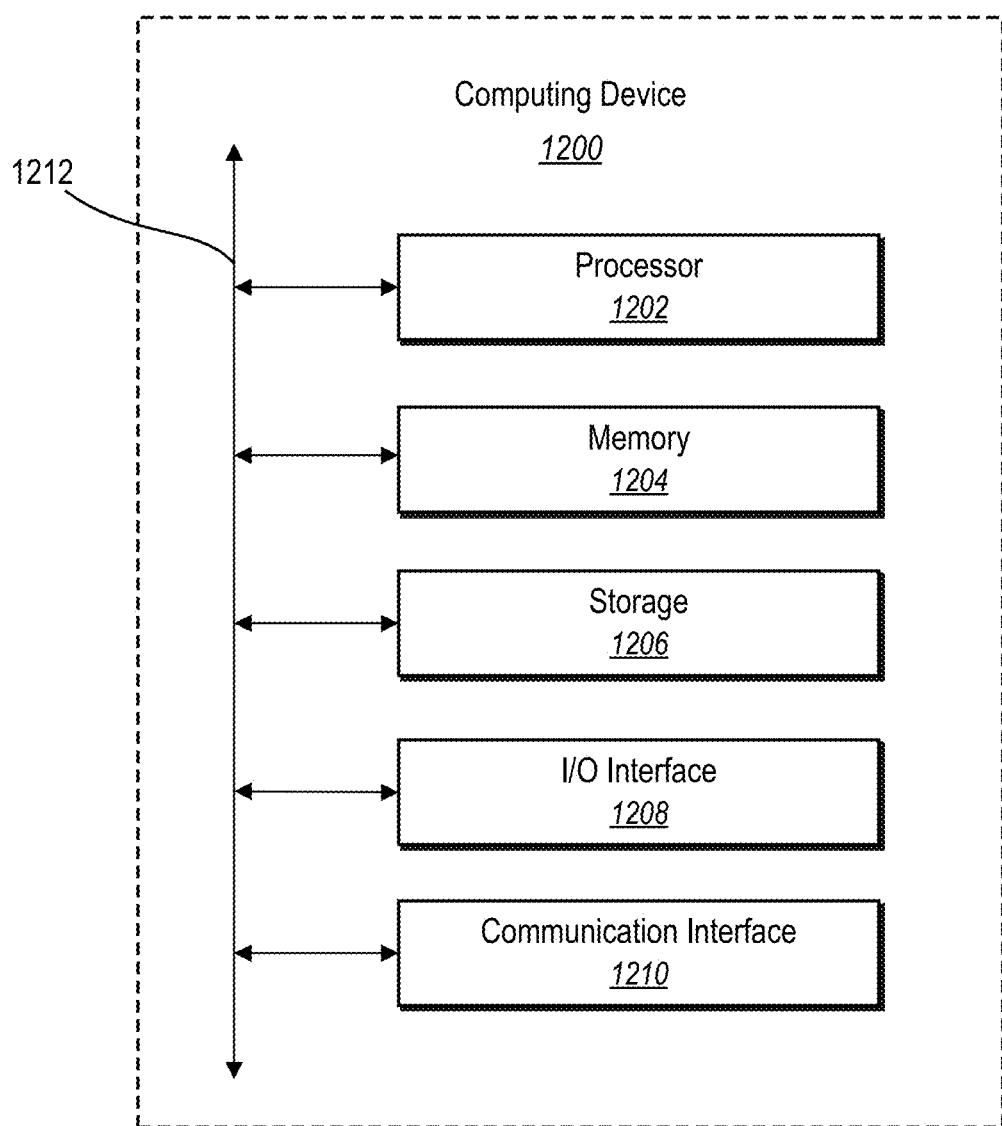
FIG. 12 illustrates a block diagram of an example computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 102, the client devices 108, the third-party server 122, and the computing devices 502, 602, 702, 802, 902, and 1002). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of the computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
providing, for display within a digital editing user interface of a client device:
a set of digital editing action blocks corresponding to sets of image modifications; and
a node compositor comprising a plurality of unpopulated fields arranged in a two-dimensional grid pattern having a plurality of columns and a plurality of rows that include at least a first row corresponding to a foreground of an image to be modified and a second row corresponding to a background of the image to be modified,
wherein each unpopulated field is separate from and adjacent to one or more other unpopulated fields; and wherein the plurality of unpopulated fields comprises at least one unpopulated field for a content block representing the image to be modified and at least one unpopulated field for an editing action;

receiving a user input to insert a digital editing action block of the set of digital editing action blocks at a position within an unpopulated field of the first row or the second row of the node compositor;

in response to the user input to insert the digital editing action block, modifying a digital image by applying image modifications associated with the digital editing action block to a foreground or a background of the digital image according to the position of the digital editing action block within the first row or the second row of the two-dimensional grid pattern of the node compositor; and providing, for display in response to receiving additional user input via a navigation element to navigate from the node compositor, a rendering window depicting the digital image as modified via the image modifications.

2. The computer-implemented method of claim 1, wherein:

receiving the user input comprises receiving the user input to insert an auto cutout action block at the position within the unpopulated field of the first row of the node compositor; and modifying the digital image comprises generating by applying an auto cutout modification to the foreground of the digital image based on the auto cutout action block being at the position within the first row of the node compositor.

3. The computer-implemented method of claim 1, wherein:

receiving the user input comprises receiving the user input to insert a color action block at the position within the unpopulated field of the second row of the node compositor; and modifying the digital image comprises generating by a color to the background of the digital image based on the color action block being at the position within the second row of the node compositor.

4. The computer-implemented method of claim 1, wherein the digital editing action block is a nested action block comprising a subset of digital editing action blocks, each digital editing action block in the subset of digital editing action blocks configured to be deleted or replaced with a different digital editing action block in response to a user input.

5. The computer-implemented method of claim 1, wherein the digital editing action block comprises a workflow action block operable in conjunction with a user input.

6. The computer-implemented method of claim 5, further comprising:

executing a first portion of the workflow action block;

providing, for display within the digital editing user interface of the client device, a prompt for an additional user input; and executing a second portion of the workflow action block based on receipt of the additional user input at the digital editing user interface of the client device.

7. The computer-implemented method of claim 6, wherein the additional user input comprises brush strokes.

8. A non-transitory computer-readable medium comprising instructions that, when executed by at least one processor, cause a computer system to perform operations comprising:

providing, for display within a digital editing user interface of a client device:

a set of digital editing action blocks corresponding to sets of image modifications; and a node compositor comprising a plurality of unpopulated fields arranged in a two-dimensional grid pattern having a plurality of columns and a plurality of rows that include at least a first row corresponding to a foreground of an image to be modified and a second row corresponding to a background of the image to be modified, wherein each unpopulated field is separate from and adjacent to one or more other unpopulated fields; and wherein the plurality of unpopulated fields comprises at least one unpopulated field for a content block representing the image to be modified and at least one unpopulated field for an editing action;

receiving a user input to insert a digital editing action block of the set of digital editing action blocks at a position within an unpopulated field of the first row or the second row of the node compositor;

in response to the user input to insert the digital editing action block, modifying a digital image by applying image modifications associated with the digital editing action block to a foreground or a background of the digital image according to the position of the digital editing action block within the first row or the second row of the two-dimensional grid pattern of the node compositor; and providing, for display in response to receiving additional user input via a navigation element to navigate from the node compositor, a rendering window depicting the digital image as modified via the image modifications.

9. The non-transitory computer-readable medium of claim 8, further comprising additional instructions that, when executed by the at least one processor, cause the computer system to perform further operations comprising providing, for display within the digital editing user interface of the client device, the set of digital editing action blocks in association with a digital editing action category of a plurality of digital editing action categories that includes at least two of: a cutouts category, an effects category, a backgrounds category, or a brushes category.

10. The non-transitory computer-readable medium of claim 8, wherein:

receiving the user input comprises receiving the user input to insert the digital editing action block at the position within the unpopulated field of the first row of the node compositor; and modifying the digital image comprises applying the image modifications associated with the digital editing action block to the foreground of the digital image based on digital editing action block being at the position within the first row of the node compositor.

11. The non-transitory computer-readable medium of claim 8, further comprising additional instructions that, when executed by the at least one processor, cause the computer system to perform further operations comprising:

in response to the user input to insert the digital editing action block, determining that one or more fields of the plurality of unpopulated fields is compatible with the digital editing action block; and providing, for display within the digital editing user interface of the client device, an indication of compatibility for the one or more fields of the plurality of unpopulated fields.

12. The non-transitory computer-readable medium of claim 8, wherein the digital editing action block is a nested action block comprising a subset of digital editing action blocks, and each digital editing action block in the subset of digital editing action blocks of the nested action block is configured to be deleted or replaced with a different digital editing action block in response to another user input.

13. The non-transitory computer-readable medium of claim 8, wherein the digital editing action block comprises a workflow action block operable in conjunction with another user input.

14. The non-transitory computer-readable medium of claim 13, further comprising additional instructions that, when executed by the at least one processor, cause the computer system to perform further operations comprising:
  executing a first portion of the workflow action block;
  providing, for display within the digital editing user interface of the client device, a prompt for one or more user inputs; and
  executing a second portion of the workflow action block based on receipt of the one or more user inputs at the digital editing user interface of the client device.

15. The non-transitory computer-readable medium of claim 8, wherein:
  receiving the user input comprises receiving the user input to insert the digital editing action block at the position within the unpopulated field of the second row of the node compositor; and
  modifying the digital image comprises applying the image modifications associated with the digital editing action block to the background of the digital image based on digital editing action block being at the position within the second row of the node compositor.

16. A system comprising:
  one or more memory devices; and
  one or more processors coupled to the one or more memory devices that cause the system to perform operations comprising:
    generating a user-defined digital editing action block based on a plurality of modifications to a digital image at a first client device;
    determining a first digital editing action category corresponding to the user-defined digital editing action block from a plurality of digital editing action categories;
    providing, for display within a digital editing user interface of a second client device, the plurality of digital editing action categories;
    generating, for display within the digital editing user interface of the second client device, a node compositor comprising a plurality of unpopulated fields arranged in a two-dimensional grid pattern having a plurality of columns and a plurality of rows that include at least a first row corresponding to a foreground of a second digital image and a second row corresponding to a background of the second digital image;
    in response to selection of the first digital editing action category, providing, for display within the digital editing user interface of the second client device, a first set of digital editing action blocks comprising the user-defined digital editing action block and system-defined digital editing action blocks from a plurality of system-defined digital editing action blocks;
    receiving a user input from the second client device to insert, at a position within an unpopulated field of the first row or the second row of the node compositor, the user-defined digital editing action block selected from the first set of digital editing action blocks;
    modifying the second digital image by applying image modifications corresponding to the user-defined digital editing action block to the foreground or the background of the second digital image according to the position of the user-defined digital editing action block within the first row or the second row of the two-dimensional grid pattern of the node compositor; and
    providing, for display in response to receiving additional user input via a navigation element to navigate from the node compositor, a rendering window depicting the second digital image as modified via the image modifications.

17. The system of claim 16, wherein applying the image modifications corresponding to the user-defined digital editing action block comprises performing the plurality of modifications to the second digital image.

18. The system of claim 16, wherein the operations further comprise:
  in response to the user input to insert an additional digital editing action block within an additional unpopulated field, determining that the additional unpopulated field is incompatible with the additional digital editing action block; and
  preventing the additional digital editing action block from being into the additional unpopulated field based on the determined incompatibility.

19. The system of claim 16, wherein the user-defined digital editing action block is a nested action block comprising a subset of digital editing action blocks corresponding to the plurality of modifications to the digital image at the first client device.

20. The system of claim 19, wherein the operations further comprise deleting a digital editing action block of the subset of digital editing action blocks in response to an additional user input at the second client device;
  wherein modifying the second digital image by applying the image modifications corresponding to the digital editing action block comprises performing the plurality of modifications to the second digital image minus a modification corresponding to the deleted digital editing action block of the subset of digital editing action blocks.

* * * * *